United States Patent
Vacon et al.

(10) Patent No.: US 12,039,409 B2
(45) Date of Patent: Jul. 16, 2024

(54) QUANTUM INFORMATION SYSTEM AND METHOD WITH ENTANGLEMENT TRACKING AND GENERATION OF VERIFIED QUANTUM INFORMATION USING METADATA

(71) Applicant: Qubit Moving and Storage, LLC, Franconia, NH (US)

(72) Inventors: Gary Vacon, East Falmouth, MA (US); Kristin A. Rauschenbach, Franconia, NH (US)

(73) Assignee: Qubit Moving and Storage, LLC, Franconia, NH (US)

( * ) Notice: Subject to any disclaimer, the term of this patent is extended or adjusted under 35 U.S.C. 154(b) by 0 days.

(21) Appl. No.: 18/349,155

(22) Filed: Jul. 9, 2023

(65) Prior Publication Data
US 2024/0135220 A1    Apr. 25, 2024

Related U.S. Application Data

(63) Continuation-in-part of application No. 18/167,589, filed on Feb. 10, 2023, and a continuation-in-part of
(Continued)

(51) Int. Cl.
*G06N 10/20* (2022.01)
*G06F 12/122* (2016.01)

(52) U.S. Cl.
CPC .......... *G06N 10/20* (2022.01); *G06F 12/122* (2013.01); *G06F 2212/1004* (2013.01)

(58) Field of Classification Search
CPC .................. G06N 10/20; G06F 12/122; G06F 2212/1004
See application file for complete search history.

(56) References Cited

U.S. PATENT DOCUMENTS 5,418,905 A    5/1995   Rarity et al.
6,028,935 A    2/2000   Rarity et al.
(Continued)

FOREIGN PATENT DOCUMENTS

CN    109415201 A    3/2019
CN    109586907 A    4/2019
(Continued)

OTHER PUBLICATIONS

Achatz et al., "High-dimensional EPR entanglement from a SPDC source at telecom wavelength", arXiv: Quantum Physics, 2021, pp. 1-7.
(Continued)

*Primary Examiner* — William E. Baughman
(74) *Attorney, Agent, or Firm* — Rauschenbach Patent Law Group, PLLC; Kurt Rauschenbach

(57) ABSTRACT

Quantum information system with metadata management includes an entangled quantum state source that generates quantum information in quantum form comprising two entangled states. A metadata collector generates metadata in classical form associated with the generated quantum information. A first receiver measures one of the two entangled states to generate quantum state information in classical form comprising a first state value and first TOA. A second receiver is configured to measure the other entangled states to generate quantum state information in classical form comprising a second state value and second TOA. A first processor generates a comb using the first TOA and the metadata to tag the generated quantum state information in classical form comprising the first state value. A second processor coupled to the first processor and to the second receiver is configured to process the comb and metadata to determine correlated data associated with the two entangled states.

20 Claims, 6 Drawing Sheets

Related U.S. Application Data application No. 18/167,670, filed on Feb. 10, 2023, and a continuation-in-part of application No. 18/167,633, filed on Feb. 10, 2023, and a continuation-in-part of application No. 18/165,303, filed on Feb. 6, 2023, and a continuation-in-part of application No. 17/988,809, filed on Nov. 17, 2022, now Pat. No. 11,829,847, which is a continuation of application No. 17/839,408, filed on Jun. 13, 2022, now Pat. No. 11,507,874, said application No. 18/165,303 is a continuation of application No. 17/465,235, filed on Sep. 2, 2021, now Pat. No. 11,614,771, said application No. 17/839,408 is a continuation of application No. 17/306,850, filed on May 3, 2021, now Pat. No. 11,367,014.

(60) Provisional application No. 63/359,874, filed on Jul. 10, 2022, provisional application No. 63/327,892, filed on Apr. 6, 2022, provisional application No. 63/218,433, filed on Jul. 5, 2021, provisional application No. 63/186,754, filed on May 10, 2021, provisional application No. 63/183,021, filed on May 2, 2021, provisional application No. 63/118,542, filed on Nov. 25, 2020, provisional application No. 63/020,221, filed on May 5, 2020.

(56) References Cited

U.S. PATENT DOCUMENTS

| | | |
|---|---|---|
| 6,609,139 B1 | 8/2003 | Dultz et al. |
| 7,028,275 B1 | 4/2006 | Chen et al. |
| 7,072,432 B2 | 7/2006 | Belcea |
| 7,242,774 B1 | 7/2007 | Elliott et al. |
| 7,286,444 B1 | 10/2007 | Bahder et al. |
| 7,581,100 B2 | 8/2009 | Mizrah |
| 7,684,015 B2 | 3/2010 | Shih |
| 7,812,303 B2 | 10/2010 | Meyers et al. |
| 7,847,234 B2 | 12/2010 | Meyers et al. |
| 8,053,715 B2 | 11/2011 | Meyers et al. |
| 8,242,428 B2 | 8/2012 | Meyers et al. |
| 8,269,978 B2 | 9/2012 | Capron et al. |
| 8,373,107 B2 | 2/2013 | Meyers et al. |
| 8,525,149 B2 | 9/2013 | Stevenson et al. |
| 8,611,535 B2 | 12/2013 | Brodsky et al. |
| 8,890,049 B2 | 11/2014 | Yuan et al. |
| 8,983,303 B2 | 3/2015 | Meyers et al. |
| 9,064,315 B2 | 6/2015 | Meyers et al. |
| 9,131,128 B2 | 9/2015 | Meyers et al. |
| 9,270,385 B2 | 2/2016 | Meyers et al. |
| 9,331,843 B2 | 5/2016 | Silverman et al. |
| 9,473,301 B2 | 10/2016 | Englund et al. |
| 9,727,959 B2 | 8/2017 | Meyers et al. |
| 9,934,469 B1 | 4/2018 | Jau et al. |
| 10,541,809 B2 | 1/2020 | Godfrey et al. |
| 10,564,933 B2 | 2/2020 | Nordholt et al. |
| 10,595,102 B2 | 3/2020 | Brodsky et al. |
| 10,790,913 B2 | 9/2020 | Henningsen et al. |
| 10,992,391 B1 | 4/2021 | Meyers et al. |
| 11,193,750 B1 | 12/2021 | Fertig et al. |
| 11,251,952 B2 | 2/2022 | Lamas-Linares et al. |
| 11,268,806 B2 | 3/2022 | Fertig et al. |
| 11,290,181 B1 | 3/2022 | Meyers et al. |
| 11,367,014 B2 | 6/2022 | Vacon et al. |
| 11,411,658 B1 | 8/2022 | Vacon et al. |
| 11,431,418 B2 | 8/2022 | Rauschenbach et al. |
| 11,507,874 B2 | 11/2022 | Vacon et al. |
| 11,610,147 B2 | 3/2023 | Vacon et al. |
| 11,614,771 B2 | 3/2023 | Vacon et al. |
| 11,616,644 B2 | 3/2023 | Vacon et al. |
| 11,728,902 B1 | 8/2023 | Meyers et al. |
| 2002/0191176 A1 | 12/2002 | Saleh et al. |
| 2004/0095582 A1 | 5/2004 | Holbrook |
| 2004/0208638 A1 | 10/2004 | Jansen |
| 2004/0258421 A1 | 12/2004 | Conti et al. |
| 2005/0100351 A1 | 5/2005 | Yuan et al. |
| 2005/0135620 A1 | 6/2005 | Kastella et al. |
| 2005/0199812 A1 | 9/2005 | Shih |
| 2006/0115086 A1 | 6/2006 | Beausoleil et al. |
| 2007/0101410 A1 | 5/2007 | Harrison et al. |
| 2008/0059712 A1 | 3/2008 | Fedorova |
| 2008/0180222 A1 | 7/2008 | Hollister et al. |
| 2009/0147955 A1 | 6/2009 | Kim et al. |
| 2009/0194702 A1 | 8/2009 | Meyers et al. |
| 2009/0290162 A1 | 11/2009 | Erkmen et al. |
| 2012/0051755 A1 | 3/2012 | Arahira |
| 2012/0294625 A1 | 11/2012 | Dynes et al. |
| 2013/0176573 A1 | 7/2013 | Bovino |
| 2014/0112478 A1 | 4/2014 | Arahira |
| 2015/0055961 A1* | 2/2015 | Meyers .................. G06N 10/00 398/140 |
| 2016/0028544 A1 | 1/2016 | Hyde et al. |
| 2016/0041032 A1 | 2/2016 | Matthews et al. |
| 2016/0112066 A1* | 4/2016 | Ashikhmin ......... H03M 13/154 714/785 |
| 2016/0164615 A1 | 6/2016 | Dailey et al. |
| 2016/0191173 A1 | 6/2016 | Malaney |
| 2016/0234017 A1 | 8/2016 | Englund et al. |
| 2017/0364796 A1 | 12/2017 | Wiebe et al. |
| 2018/0152295 A1 | 5/2018 | Drost et al. |
| 2018/0232649 A1 | 8/2018 | Wiebe et al. |
| 2018/0239592 A1 | 8/2018 | Nordholt et al. |
| 2018/0365585 A1* | 12/2018 | Smith .................... G06F 9/3877 |
| 2019/0042971 A1* | 2/2019 | Zou ......................... G06F 15/16 |
| 2019/0103962 A1 | 4/2019 | Howe et al. |
| 2019/0376820 A1 | 12/2019 | Jones et al. |
| 2020/0044749 A1 | 2/2020 | Rauschenbach et al. |
| 2020/0084033 A1 | 3/2020 | Lamas-Linares et al. |
| 2020/0183250 A1 | 6/2020 | Hall et al. |
| 2020/0233645 A1 | 7/2020 | Nordholt et al. |
| 2020/0274703 A1 | 8/2020 | Lukens et al. |
| 2020/0313879 A1 | 10/2020 | Hong et al. |
| 2020/0334101 A1 | 10/2020 | Albert et al. |
| 2020/0374211 A1 | 11/2020 | Griffin et al. |
| 2020/0379171 A1 | 12/2020 | Li et al. |
| 2020/0382219 A1* | 12/2020 | Innes .................... H04W 12/04 |
| 2021/0105135 A1 | 4/2021 | Figueroa et al. |
| 2021/0116639 A1 | 4/2021 | Fertig et al. |
| 2021/0124640 A1* | 4/2021 | Nickerson .............. G06N 10/70 |
| 2021/0132969 A1* | 5/2021 | Smith .................... G06N 10/00 |
| 2021/0133614 A1 | 5/2021 | Ashrafi |
| 2021/0273731 A1 | 9/2021 | Zhang et al. |
| 2021/0295196 A1 | 9/2021 | Gimeno-Segovia |
| 2021/0296558 A1 | 9/2021 | Englund et al. |
| 2021/0325605 A1 | 10/2021 | Rudolph et al. |
| 2021/0334237 A1* | 10/2021 | Coady .................... G06F 16/13 |
| 2022/0019409 A1 | 1/2022 | Bharadwaj et al. |
| 2022/0043128 A1 | 2/2022 | Pacala et al. |
| 2022/0069152 A1 | 3/2022 | Tosi et al. |
| 2022/0084085 A1 | 3/2022 | Rigetti et al. |
| 2022/0085985 A1 | 3/2022 | Kaplan |
| 2022/0114471 A1 | 4/2022 | Vacon et al. |
| 2022/0214713 A1 | 7/2022 | Vacon et al. |
| 2022/0309375 A1 | 9/2022 | Vacon et al. |
| 2022/0353068 A1 | 11/2022 | Vacon et al. |
| 2023/0058994 A1 | 2/2023 | Vacon et al. |
| 2023/0177375 A1 | 6/2023 | Vacon et al. |
| 2023/0185330 A1 | 6/2023 | Vacon et al. |
| 2023/0216670 A1 | 7/2023 | Vacon et al. |
| 2023/0324527 A1 | 10/2023 | Vacon et al. |
| 2023/0327778 A1 | 10/2023 | Vacon et al. |
| 2023/0327779 A1 | 10/2023 | Vacon et al. |
| 2023/0336336 A1 | 10/2023 | Vacon et al. |
| 2023/0375327 A1 | 11/2023 | Vacon et al. |

FOREIGN PATENT DOCUMENTS

| | | |
|---|---|---|
| EP | 3771137 A1 | 1/2021 |
| JP | 6060737 B2 | 1/2017 |
| JP | 6708062 B2 | 6/2020 |
| KR | 10-2021-0154364 A | 12/2021 |
| WO | 2020/140850 A1 | 7/2020 |

(56) References Cited

FOREIGN PATENT DOCUMENTS

| | | |
|---|---|---|
| WO | 2020/180672 A1 | 9/2020 |
| WO | 2020/232546 A1 | 11/2020 |
| WO | 2021/013990 A1 | 1/2021 |
| WO | 2021/262322 A2 | 12/2021 |
| WO | 2022/140011 A2 | 6/2022 |
| WO | 2022/159902 A1 | 7/2022 |
| WO | 2023/196749 A1 | 10/2023 |
| WO | 2023/225456 A1 | 11/2023 |

OTHER PUBLICATIONS

Agam et al., "Shot Noise In Chaotic Systems; "Classical" to Quantum Crossover", Physical Review Letters, vol. 85, No. 15, Oct. 9, 2000, pp. 3153-3156.

Altepeter et al., "Phase-compensated Ultra-bright Source of Entangled Photons", Optics Express, vol. 13, No. 22, Oct. 31, 2005, pp. 8951-8959.

Anderson, Brian P., "Field Guide to Quantum Mechanics", SPIE Field Guides, vol. FG44, 2019, 152 pages.

Arrazola et al., "Quantum Fingerprinting with Coherent States and a Constant Mean Number of Photons", Physical Review, A 89, 2014, pp. 062305-1-062305-6.

Aull et al., "Geiger-Mode Avalanche Pholodiodes for Three-Dimensional Imaging", Lincoln Laboratory Journal, vol. 13, No. 2, 2002, pp. 335-350.

Avalanche Pholodiodes: A User's Guide, PerkinElmer, 2003, 8 pages.

Ball et al., "Quantum Firmware and the Quantum Computing Stack", Physics Today, vol. 74, No. 3, Mar. 2021, pp. 28-34.

Bauerle et al. "Coherent Control of Single Electrons: A Review of Current Progress", Rep. Prog. Phys., vol. 81, No. 56503, Apr. 5, 2018, 33 pages.

Bedington et al., "Progress in Satellite Quantum Key Distribution", Quantum Information, vol. 3, 2017, pp. 1-13.

Bennett et al., "Entanglement-Assisted Classical Capacity of Noisy Quantum Channels", Physical Review Letters, vol. 83, No. 15, Oct. 11, 1999, pp. 3081-3084.

Bennett et al., "Purification of Noisy Entanglement and Faithful Teleportation via Noisy Channels", vol. 76, No. 5, Jan. 29, 1996, pp. 722-725.

Bennett et al., "Quantum Cryptography: Public Key Distribution and Coin Tossing", Theoretical Computer Science Theoretical Aspects of Quantum Cryptography, vol. 560, Part 1, 2014, pp. 7-11.

Bennett et al., "Teleporting an Unknown Quantum State via Dual Classical and Einstein-Podolsky-Rosen Channels", Physical Review Letters, vol. 70, No. 13, Mar. 29, 1993, pp. 1895-1899.

Bhandari et al., "Low-Cost Coincidence-Counting Electronics for Quantum Optics", Department of Physics, 2007, 2 pages.

Boso et al., "Low-cost and Compact Single-photon Counter Based on a CMOS SPAD Smart Pixel", IEEE Photonics Technology Letters, vol. 27, No. 23, Dec. 1, 2015, 4 pages.

Boughn, Stephen, "Making Sense of Bell's Theorem and Quantum Nonlocality", Found Physics, 2017, 18 pages.

Brunner et al., "Bell nonlocality", Reviews of Modern Physics, vol. 86, 2014, pp. 419-478.

Brunner et al., "Detection Loophole in Asymmetric Bell Experiments", PRL 98, 220403, 2007, pp. 220403-1-220403-4.

Butner et al., "Nanosecond-scale Event Synchronization over Local-area Networks", Proceedings of the 27th Annual IEEE Conference on Local Computer Networks, 2021, 9 pages.

Chang et al., "Quantification of High-dimensional Energy-time Entanglement in a Biphoton Frequency Comb", FM3M.6, CLEO 2021, 2 pages.

Chapman et al., "Hyperentangled Time-bin and Polarization Quantum Key Distribution", arXiv:1908.09018v3, 2020, 39 pages.

Chen et al., "Experimental demonstration of conjugate-Franson interferometry", Research Laboratory of Electronics, Massachusetts Institute of Technology, Cambridge, MA 02139 ,USA, May 3, 2021, pp. 1-7.

Chen et al., "Heralded Quantum Random Access Memory in a Scalable Photonic Integrated Circuit Platform", Optical Society of America, 2021, 2 pages.

Chen et al., "Joint Time and Frequency Dissemination Network Over Delay-Stabilized Fiber Optic Links", IEEE Photonics Journal, vol. 7, No. 3, Jun. 2015, 10 pages.

Chen et al., "Supplemental Material for Experimental Demonstration of Conjugate-Franson Interferometry, Research Laboratory of Electronics", Massachusetts Institute of Technology, Cambridge, MA 02139, May 3, 2021, pp. 1-4.

Cho, et al., "Highly Efficient Optical Quantum Memory with Long Coherence Time in Cold Atoms", Optica, vol. 3, No. 1, Jan. 15, 2016, pp. 100-107.

Clemmen et al., "All-optically tunable buffer for single photons", Optics Letters, vol. 43, No. 9, Apr. 27, 2018, pp. 2138-2141.

D'Ambrosio et al., "Complete Experimental Toolbox for Alignment-Free Quantum Communication", Nature Communications, vol. 3, 2012, 8 pages.

Das et al., "Robust Quantum Network Architectures and Topologies for Entanglement Distribution", Physical Review A 97, 2018, pp. 012335-1-012335-12.

Demirel et al., "Correlations for Computation and Computation for Correlations", Nature Partner Journals, vol. 7, 2021, pp. 1-8.

Devetak et al., "Distillation of Secret Key and Entanglement from Quantum States", Proceedings of the Royal Society A, vol. 461, 2004, pp. 207-235.

Ding et al., "The Cross-Correlation of Binary Sequences with Optimal Autocorrelation", IEEE Transactions On Information Theory, 2010, vol. 56, No. 4, Apr. 2010, pp. 1694-1701.

Ekert, Artur K., "Quantum Cryptography Based on Bell's Theorem", Physical Review Letters, vol. 67, No. 6, Aug. 5, 1991, pp. 661-663.

Erkmen et al., "Ghost Imaging: From Quantum to Classical to Computational", Advances in Optics and Photonics, vol. 2, 2010, pp. 405-450.

Fanto et al., "Multipli-Entangled Photons from a Spontaneous Parametric Down-conversion Source", Quantum Information and Computation, vol. 8057, 2011, pp. 805705-1-805705-12.

Galvez, Enrique J., "Correlated-Photon Experiments Laboratory Manual", Colgate University, 2008, 27 pages.

Gentry et al., "Quantum-correlated Photon Pairs Generated in a Commercial 45 nm Complementary Metal-Oxide Semiconductor Microelectronic Chip", Optica, vol. 2, No. 12, Dec. 2015, pp. 1065-1071.

Giovannetti et al., "Limits to Clock Synchronization Induced by Completely Dephasing Communication Channels", Physical Review A, vol. 65, Jun. 17, 2002, pp. 062319-1-062319-6.

Giovannetti et al., "Quantum-Enhanced Positioning and Clock Synchronization", Nature, vol. 412, Jul. 26, 2001, 16 pages.

Gisin, Nicolas, "Entanglement 25 Years after Quantum Teleportation: Testing Joint Measurements in Quantum Networks", Entropy, vol. 21, 2019, pp. 1-12.

Gogo et al., "Comparing Quantum and Classical Correlations in a Quantum Eraser", Physical Review A, vol. 71, 2005, pp. 052103-1-052103-6.

Goswami et al., "Indefinite Causal Order in a Quantum Switch", Physical Review Letters, vol. 121, 2018, pp. 090503-1-090503-5.

Goswami, Abhirup, "Analysis of a Deterministic Entangled Photon Pair Source using Single Photons", Sep. 2016, 79 pages.

Grieve et al., "Correcting for Accidental Correlations in Saturated Avalanche Photodiodes", Optics Express, vol. 24, No. 4, Feb. 22, 2016, pp. 3592-3600.

Guccione et al., "Connecting Heterogeneous Quantum Networks by Hybrid Entanglement Swapping", Sci. Adv., vol. 6, No. 22, 2020, pp. 1-6.

Guo et al., "Tesling the Bell Inequality on Frequency-Bin Entangled Photon Pairs Using Lime-Resolved Detection", Optica, vol. 4, No. 4, Apr. 2017, pp. 388-392.

Haider et al., "Entangling Independent Photons by Time Measurement", Nature Physics, vol. 3, Oct. 2007, pp. 692-695.

Hamel et al., "Direct Generation of Three-Photon Polarization Entanglement", Institute for Quantum Computing and Department of Physics & Astronomy, Apr. 28, 2014, 9 pages.

(56) References Cited

OTHER PUBLICATIONS

Haroche, Serge, "Entanglement, Decoherence and The Quantum/Classical Boundary", Physics Today, vol. 51, Jul. 1998, pp. 36-42.
Quan et al., "Demonstration of Quantum Synchronization Based on Second-order Quantum Coherence of Entangled Photons", Scientific Reports, vol. 6, 2016, pp. 1-8.
Quan et al., "Nonlocal Temporal Correlation Identification of Entangled Photon Pairs for Quantum Clock Synchronization", 10 pages.
Rangarajan et al., "Optimizing Type-I Polarization-Entangled Photons", Optics Express, vol. 17, No. 21, Oct. 12, 2009, pp. 18920-18933.
Rarity et al., "Single-photon Counting for the 1300-1600-nm Range by Use of Peltier-cooled and Passively Quenched nGaAs Avalanche Photodiodes", Applied Optics, vol. 39, No. 36, Dec. 20, 2000, pp. 6746-6753.
Resch et al., "Distributing Entanglement and Single Photons Through an Intra-city, Free-Space Quantum Channel", Optics Express, vol. 13, No. 1, Jan. 10, 2005, pp. 202-209.
Rizzi et al., "White Rabbit Clock Synchronization: Ultimate Limits on Close-In Phase Noise and Short-Term Stability Due to FPGA Implementation", IEEE Transactions on Ultrasonics, Ferroelectrics, and Frequency Control, vol. 65, No. 3, Sep. 2018, pp. 1726-1737.
Saleh et al., "Towards Spontaneous Parametric Down Conversion from Monolayer MoS2", Scientific Reports, vol. 8, No. 3862, 2018, 7 pages.
Seijo et al., "Enhanced Timestamping Method for Sub-Nanosecond Time Synchronization in IEEE 802.11 over WLAN Standard Conditions", IEEE Transactions on Industrial Informatics, vol. 16, No. 9, Sep. 2020, pp. 5792-5805.
Shapiro et al., "Classical Imaging with Undetected Photons" Scientific Reports, vol. 5, No. 10329, 2015, pp. 1-8.
Shapiro et al., "On-Demand Single-photon Generation using a Modular Array of Parametric Downconverters with Electro-Optic Polarization Controls," Opt. Lett., vol. 32, 2007, pp. 2698-2700.
Shen et al., "Classically Entangled Vectorial Structured Light towards Multiple Degrees of Freedom and Higher Dimensions", STh1B.1, CLEO 2021, 2 pages.
Shi et al., "Privacy-preserving Quantum Sealed-bid Auction Based on Grover's Search Algorithm", Scientific Reports, vol. 9, 2019, pp. 1-10.
Shi et al., "Breakdown Flash at Telecom Wavelengths in InGaAs Avalanche Photodiodes", Optics Express, vol. 25, No. 24, Nov. 27, 2017, pp. 30388-30394.
Shih, Yanhua, "The Physics of Ghost Imaging", Optical Society of America, 32 pages.
Shrivastav et al., "Globally Synchronized Time via Datacenter Networks", IEEE/ACM Transactions On Networking, vol. 27, No. 4, Aug. 2019, pp. 1401-1416.
Simon et al., "High-capacity Quantum Key Distribution via Hyperentangled Degrees of Freedom", New Journal of Physics, vol. 16, Jun. 24, 2014, 21 pages.
Sloan et al., "Two Photon Emission from Superluminal and Accelerating Index Changes", FM3N.4, CLEO 2021, 2 pages.
Smith et al., "Quantifying Coherence and Entanglement via Simple Measurements", arXiv:1707.09928v1, Jul. 31, 2017, 9 pages.
Stipcevic, Mario, "Quantum Random Number Generators and their Applications in Cryptography", Proc. of SPIE, vol. 8375, 2012, pp. 837504-1-837504-15.
Strekalov et al., "Postselection-Free Energy-time Entanglement", Physical Review A, Third Series, vol. 54, No. 1, Jul. 1996, pp. R1-R4.
Sulimany et al., "All-Fiber Source and Sorter for Multimode Correlated Photons", JTh3A.17, CLEO 2021, 2 pages.
Suprano et al., "Detection Techniques for Orbital Angular Momentum States", JTh3A.59, CLEO 2021, 2 pages.
Time in Distributed Systems, University of Cambridge, Cambridge, UK, 20 pages.
Time in Distributed Systems: Clocks and Ordering of Events, Indian Institute of Technology Kharagpur, Department of computer Science and Engineering, 38 pages.

Tittel et al., "Long-distance Bell-Type Tests Using Energy-time Entangled Photons", University of Geneva, Group of Applied Physics, 20,Rue de l'Ecole de Medecine, CH-1211 Geneva 4, Switzerland, Nov. 4, 2018, pp. 1-22.
Treiber et al., "A Fully Automated Entanglement-Based Quantum Cryptography System for Telecom Fiber Networks", New Journal of Physics, vol. 11, Apr. 30, 2009, 20 pages.
Unternahrer et al., "Coincidence Detection of Spatially Correlated Photon Pairs With a Monolithic Time-Resolving Detector Array", Optics Express, vol. 24, No. 15, Dec. 12, 2016, pp. 28829-28841.
Unternahrer et al., "Coincidence Detection of Spatially Correlated Photon Pairs with a Novel Type of Monolithic Time-Resolving Detector Array", IEEE, 2017, 1 page.
Ursin et al. "Entanglement-based Quantum Communication Over 144 Km", Nature Physics, vol. 3, Jul. 2007, pp. 481-486.
Ursin et al., "Quantum Teleportation across the Danube", Nature, vol. 430, Aug. 19, 2004, pp. 849.
Using Coincidence Correlation for Studying Quantum Optic Systems, Piqoquant GMBH, Jun. 1, 2018, 6 pages.
Venkatasubramanian, Nalini, "Time in Distributed Systems", 66 pages.
Wang et al., "On-Demand Semiconductor Source of Entangled Photons Which Simultaneously Has High Fidelity, Efficiency, and Indistinguishability", Physical Review Letters, vol. 122, 113602, 2019, 6 pages.
Weihs et al., "Violation of Bell's Inequality Under Strict Einstein Locality Conditions", Physical Review Letters, vol. 81, No. 23, Dec. 7, 1998, pp. 5039-5043.
Wengerowskya et al., "Entanglement Distribution over a 96-km-Long Submarine Optical Fiber", PNAS, vol. 116, No. 14, Apr. 2, 2019, pp. 684-6688.
Wittje, Roland, "Noise: From Nuisance to Research Subject", Physics Today 73, Feb. 2020, pp. 8 pages.
Xie et al., "A High-Precision 2.5-ps RMS Time Synchronization for Multiple High-Speed Transceivers in FPGA", IEEE Transactions On Nuclear Science, vol. 66, No. 7, Jul. 2019, pp. 1070-1075.
Zhang et al., "Examples on Quantum Search Algorithm with Optimized Depth", Dec. 11, 2019, pp. 1-7.
Zhao et al., "Experimental Demonstration of Five-Photon Entanglement and Open-Destination Teleportation", Nature, vol. 430, Jul. 2004, 19 pages.
Zhunag et al., "Entanglement-Enhanced Lidars for Simultaneous Range and Velocity Measurements." Physical Review A, vol. 96, No. 4, Oct. 2017, pp. 040304-1-040304-6.
Zielnicki, Kevin, "Pure Sources And Efficient Detectors for Optical Quantum Information Processing", 2014, 104 pages.
Heshami et al., "Quantum memories: Emerging Applications and Recent Advances," Journal of modern optics, vol. 63, No. 20, 2016, pp. 2005-2028.
Hong et al., "Measurement of Subpicosecond Time Intervals between Two Photons by Interference," Physical Review Letters, vol. 59, No. 18, 2044, Nov. 2, 1987, pp. 1-3.
Hong et al., "Optical Communication Channel Based on Coincident Photon Pairs", Applied Optics, vol. 24, No. 22, Nov. 15, 1985, pp. 3877-3882.
Hu et al., "Beating the Channel Capacity Limit for Superdense Coding with Entangled Ququarts", Science Advances, vol. 4 , Jul. 20, 2018, pp. 1-5.
Ilic, Nikolina, "The Ekert Protocol", Journal of Physics, vol. 334, Jul. 22, 2007, 4 pages.
Jennewein et al., "Quantum Cryptography with Entangled Photons", Physical Review Letters, vol. 84, No. 20, May 15, 2000, pp. 4729-4732.
Jin et al., "Long-Range Distribution of High-quality Time-Bin Entangled Photons for Quantum Communication", Journal of the Korean Physical Society, vol. 80, Dec. 2021, pp. 203-213.
Joly et al., "Fibre-Based Pressure-Controlled Sources for Quantum Optics", STh1A.5, CLEO 2021, 2 pages.
Jozsa et al., "Quantum Clock Synchronization Based on Shared Prior Entanglement", Physical Review Letters, vol. 85, No. 9, Aug. 28, 2000, pp. 2010-2013.

(56) References Cited

OTHER PUBLICATIONS

Jung et al., "Remote Laser-Microwave Synchronization Over Kilometer-Scale Fiber Link With Few-Femtosecond Drift" Journal of Lightwave Technology, vol. 32, No. 20, Oct. 15, 2014, pp. 3742-3748.
Kaczmarek et al., "A Noiseless Quantum Optical Memory at Room Temperature", Frontiers in Optics, 2017, 2 pages.
Kanamori et al., "Three-party Quantum Authenticated Key Distribution with Partially Trusted Third Party", IEEE Global Telecommunications Conference, IEEE, 2008, 5 pages.
Kaneda et al., "Heralded Single-Photon Source Utilizing Highly Nondegenerate, Spectrally Factorable Spontaneous Parametric Downconversion", Optics Express, vol. 24, No. 10, May 16, 2016, pp. 10733-10747.
Karlsson et al., "Quantum Teleportation using Three-Particle Entanglement", Physical Review A, vol. 58, No. 6, Dec. 1998, pp. 4394-4400.
Kashi et al., "Enabling Scalability of Photonic Frequency-Domain Quantum Processing", FM1N.4, CLEO 2021, 2 pages.
Kavuri et al., "Quantum State Tomography at the Tsirelson Bound", JTu3A.45, CLEO 2021, 2 pages.
Kemparaj et al., "Secure Precision Time Protocol in Packet Switched Networks", IEEE, 2019, 6 pages.
Kiesel et al., "Experimental Analysis of a Four-Qubit Photon Cluster State", Physical Review Letters, vol. 95, 210502, Nov. 18, 2005, pp. 1-4.
Kim et al., "Delayed "Choice" Quantum Eraser", Physical Review Letters, vol. 84, No. 1, Jan. 3, 2000, 5 pages.
Kong et al., "Implementation of Multiparty quantum clock synchronization", arXiv:1708.06050v2, 2017, 6 pages.
Kviatkovsky et al., "Microscopy with Undetected Photons in the Mid-Infrared", FTh2O.5, CLEO 2021, 2 pages.
Kwiat et al., "New High-Intensity Source of Polarization-Entangled Photon Pairs", Physical Review Letters, vol. 75, No. 24, Dec. 11, 1995, pp. 4337-4341.
Lee et al., "Temporal Multiplexing of Heralded Single Photon Sources Using Optical Fiber Delays", Korea Institute of Science and Technology Information—Korea Research Institute of Standards and Science, 2020, 3 pages.
Lee, Catherine, "High-Dimensional Quantum Communication Deployed Fiber", Feb. 2018, 143 pages.
Lesovik et al., "Arrow of Time and its Reversal on the IBM Quantum Computer", Scientific Reports, 2019, vol. 9, No. 4396, 2019, 8 pages.
Leung et al., "Deterministic Bidirectional Communication and Remote Entanglement Generation Between Superconducting Qubits", npj Quantum Information, vol. 5, 2019, 5 pages.
Li et al., "Quantum Supremacy Circuit Simulation on Sunway TaihuLight", URL:https://arxiv.org/pdf/1804.04797.pdf Aug. 13, 2018, pp. 1-11.
Liu et al., "General Scheme for Superdense Coding Between Multiparties", Physical Review A, vol. 65, 2002, pp. 022304-1-022304-4.
Llo-Okeke et al., "Remote Quantum Clock Synchronization without Synchronized Clocks", Npj Quantum Information, 2018, 5 pages.
Lloyd et al., "Long Distance, Unconditional Teleportation of Atomic States via Complete Bell State Measurements", Physical Review Letters, vol. 87, No. 16, Oct. 15, 2001, pp. 167903-1-167903-4.
Luo et al., "High-Reliability Sub-Nanosecond Network Time Synchronization Method Enabled by Double-Frequency Distributed Time Synchronization", Journal of Optical Communications and Networking, vol. 11, No. 1, Jan. 2019, pp. A40-A51.
Mahmood et al., "Delay and Jitter Characterization for Software-Based Clock Synchronization Over WLAN Using PTP", IEEE Transactions on Industrial Informatics, vol. 10, No. 2, May 2014, pp. 1198-1206.
Mandel. L., "Proposal for Almost Noise-free Optical Communication under Conditions of High Background", J. Opt. Soc. Am. B, vol. 1, No. 1, Mar. 1984, pp. 108-110.
Martin et al., "Quantifying Photonic High-Dimensional Entanglement", vol. 118, issue 11, Mar. 17, 2017, pp. 110501-1-110501-5.
Matsukevich et al., "Bell Inequality Violation with Two Remote Atomic Qubits", Physical Review Letters, vol. 100, Apr. 18, 2008, pp. 150404-1-150404-4.
Mattle et al., "Dense Coding in Experimental Quantum Communication", Physical Review Letters, vol. 76, No. 25, Jun. 17, 1996, pp. 4656-4659.
Merkouche et al., "Multiple Pulse-Mode Bell States Heralded via Entanglement Swapping", JM4E.6, CLEO 2021, 2 pages.
Meyer-Scott et al., "Single-Photon Sources: Approaching the Ideal Through Multiplexing", Review of Scientific Instruments, 2020, vol. 91, No. 4, 2020, pp. 041101-1-041101-18.
Mkacher et al., "Calibrating NTP", IEEE, 2019, 6 pages.
Morrison et al., "High Dimensional Frequency-bin Entanglement from Domain Engineered Parametric Downconversion", FM1N.1, CLEO, 2021, 2 pages.
Muller et al., "On-demand Generation of Indistinguishable Polarization-Entangled Photon Pairs," URL:https://arxiv.org/ftp/arxiv/papers/1308/1308.4257.pdf, Aug. 21, 2013, 5 pages.
Nolleke et al., "Efficient Teleportation Between Remote Single-Atom Quantum Memories", Physical Review Letters, vol. 110, Apr. 5, 2013, pp. 140403-1-140403-5.
Nunn et al., "Enhancing Multiphoton Rates with Quantum Memories", Centre for Quantum Technologies, Sep. 9, 2018, 5 pages.
Oh, J., et al., "Coincidence Rates for Photon Pairs in WDM Environment", Journal of Lightwave Technology, vol. 29, No. 3, Feb. 1, 2011, pp. 324-329.
Paesani et al., "Generation and Sampling of Quantum States of Light in a Silicon Chip", Nature Physics, 2018, 27 pages.
Pant et al., Routing Entanglement in the Quantum Internet, arXiv:1708.07142v2, Sep. 22, 2017, 13 pages.
Park et al., "High-Performance Reconfigurable Coincidence Counting Unit Based on a Field Programmable Gate Array", Applied Optics, vol. 54, No. 15, May 20, 2015, pp. 4727-4731.
Peloso et al., "Daylight Operation of a Free Space, Entanglement-based Quantum Key Distribution System", New Journal of Physics 11, 2009, 13 pages.
Pfaff et al., "Unconditional Quantum Teleportation Between Distant Solid-state Quantum Bits", Quantum Information, vol. 345, No. 6196, Aug. 1, 2014, pp. 532-535.
Placke et al., "Engineering AlGaAs-on-Insulator towards Quantum Optical Applications", JTu3A.20, CLEO 2021, 2 pages.

\* cited by examiner

QUANTUM INFORMATION SYSTEM AND METHOD WITH ENTANGLEMENT TRACKING AND GENERATION OF VERIFIED QUANTUM INFORMATION USING METADATA

CROSS REFERENCE TO RELATED APPLICATION

The present application claims benefit of U.S. Provisional Patent Application Ser. No. 63/359,874, entitled "Quantum Information System and Method with Entanglement Tracking and Generation of Verified Quantum Information Using Metadata", filed on Jul. 10, 2022. The present application is also a continuation-in-part of U.S. patent application Ser. No. 17/988,809, entitled "Quantum Cache", filed on Nov. 17, 2022, which is a continuation of U.S. patent application Ser. No. 17/839,408, entitled "System and Method for Sharing Quantum Information", filed on Jun. 13, 2022, now granted as U.S. Pat. No. 11,507,874 on Nov. 22, 2022, which is a continuation of U.S. patent application Ser. No. 17/306,850, entitled "System and Method for Quantum Cache", filed on May 3, 2021, now granted as U.S. Pat. No. 11,367,014 on Jun. 21, 2022, which is a non-provisional application of U.S. Provisional Patent Application Ser. No. 63/183,021, entitled "System and Method for Quantum Cache", filed on May 2, 2021, and is a non-provisional application of U.S. Provisional Patent Application No. 63/020,221, entitled "System and Method for Quantum Cache", filed on May 5, 2020. The present application is also a continuation-in-part of U.S. patent application Ser. No. 18/165,303, entitled "Method for Determining Quantum Entangled State Information", filed on Feb. 6, 2023, which is a continuation of U.S. patent application Ser. No. 17/465,235, entitled "Method for Synchronizing and Locking Clocks", filed on Sep. 2, 2021, now granted as U.S. Pat. No. 11,614,771 on Mar. 28, 2023, which is a non-provisional application of U.S. Provisional Patent Application Ser. No. 63/118,542, entitled "System and Method for Sharing Quantum Entanglement", filed on Nov. 25, 2020, and is a non-provisional application of U.S. Provisional Patent Application No. 63/186,754, entitled "System and Method for Sharing Quantum Entanglement", filed on May 10, 2021, and is a non-provisional application of U.S. Provisional Patent Application No. 63/218,433, entitled "System and Method for Sharing Quantum Entanglement", filed on Jul. 5, 2021. The present application is also a continuation-in-part of U.S. patent application Ser. No. 18/167,589, entitled "Method and System for Identifying Entangled Photons without Classical Information Sharing", filed on Feb. 10, 2023, which is a non-provisional application of U.S. Provisional Patent Application Ser. No. 63/327,892, entitled "Correlated Quantum State Identification System and Method" filed on Apr. 6, 2022. The present application is also a continuation-in-part of U.S. patent application Ser. No. 18/167,633, entitled "Method and System for Identifying Entangled Photons with One-Way Classical Information Sharing", filed on Feb. 10, 2023, which is a non-provisional application of U.S. Provisional Patent Application Ser. No. 63/327,892, entitled "Correlated Quantum State Identification System and Method" filed on Apr. 6, 2022. The present application is also a continuation-in-part of U.S. patent application Ser. No. 18/167,670, entitled "System and Method for Entangled State Identification Using Metadata", filed on Feb. 10, 2023, which is a non-provisional application of U.S. Provisional Patent Application Ser. No. 63/327,892, entitled "Correlated Quantum State Identification System and Method" filed on Apr. 6, 2022. The entire contents of U.S. patent application Ser. Nos. 17/988,809, 17/839,408, 17/306,850, 18/165,303, 17/465,235, 18/167,589, 18/167,633, and 18/167,670, and U.S. Provisional Patent Application Nos. 63/359,874, 63/183,021, 63/020,221, 63/118,542, 63/186,754, 63/218,433 and 63/327,892 are herein incorporated by reference.

The section headings used herein are for organizational purposes only and should not be construed as limiting the subject matter described in the present application in any way.

INTRODUCTION

Systems that exchange and process information using quantum states are useful for a wide variety of computing, communication, and measurement applications. For example, quantum entanglement is a valuable quantum resource that allows information to be shared between different users with properties that are not possible with classical sharing schemes. As another example, quantum superposition supports computation and information sharing with high-dimensional potential per bit. As another example, non-local phase correlations support precision and/or low noise metrology. These are just examples, many other quantum behaviors, systems and applications are known to improve various aspects of numerous kinds of information systems. The development of practical quantum information systems is still in the early stages, thus effective and efficient control and management technology to support such practical systems is still needed.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale; emphasis instead generally being placed upon illustrating principles of the teaching. The drawings are not intended to limit the scope of the Applicant's teaching in any way.

DESCRIPTION OF VARIOUS EMBODIMENTS

Figure 1:
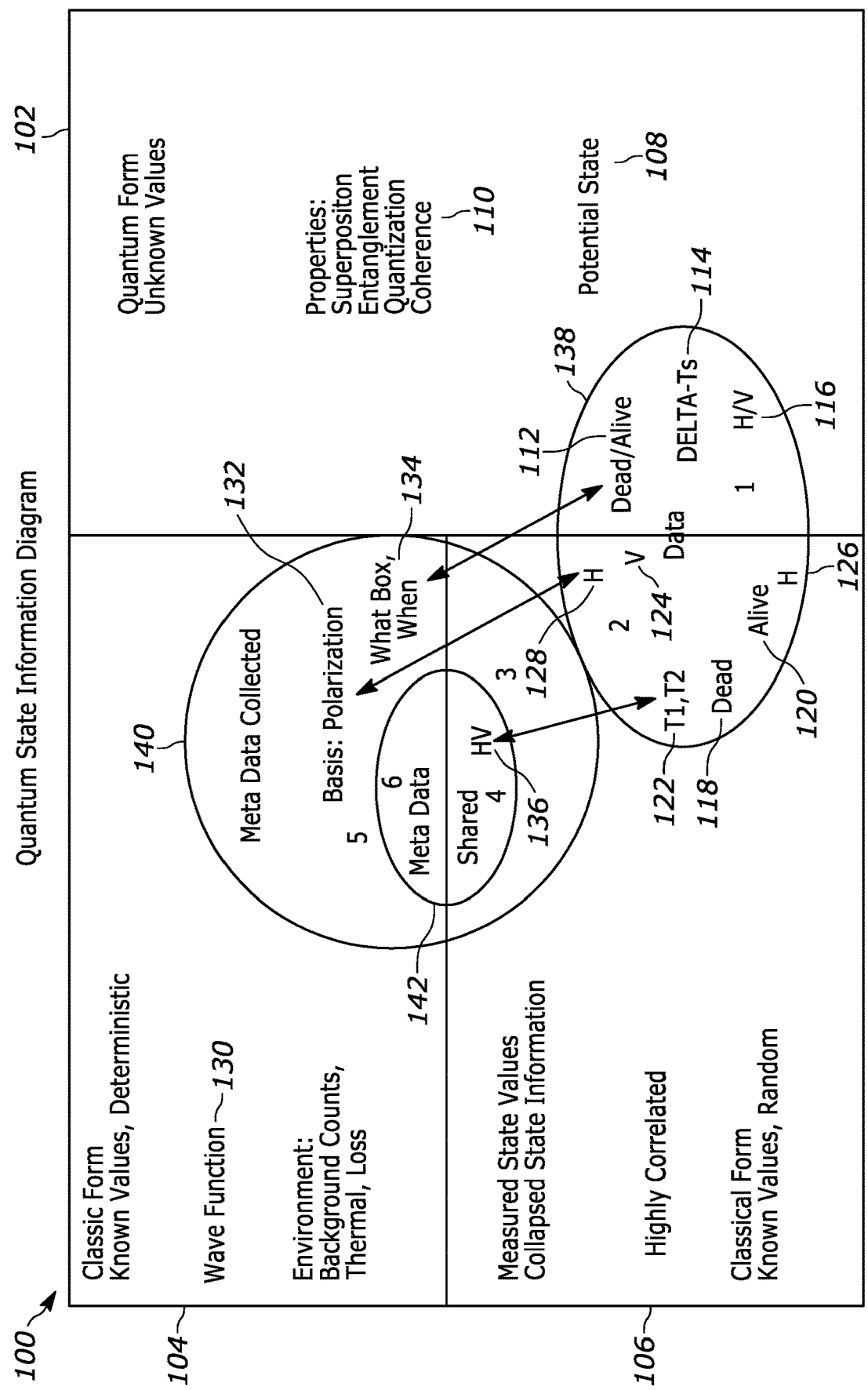
FIG. 1 illustrates a diagram showing different categories of quantum information used in embodiments of the method and system of quantum information system management using metadata of the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Quantum information is a powerful resource that has numerous applications in a variety of processing, sensing and communications applications. Quantum information in its quantum form has powerful properties including, for example, quantization, superposition, non-locality, correlation and combinations of these qualities. One important and basic requirement for the efficient and effective use of quantum information is the need to quickly and/or easily identify and/or describe properties of the quantum information in a quantum system in a way that classical systems can process and use.

One feature of entangled photons is that each photon in a pair of entangled photons can carry state information that is entangled such that the values of those states are the same when measured. As such, it is useful in methods according to the present teaching to identify photons that are part of a pair of entangled photons in order to know that a particular measured value is one of two shared correlated values. Also, in methods according to the present teaching it is useful to know a fidelity of a quantum state that is still in a coherent superposition to know before that state is measured or otherwise used in a quantum information system. As such, it is often useful to provide fidelity information associated with quantum information carried in quantum states. As yet another feature of the present teaching, it is important to know where, when and how to look for, or measure, quantum information. For example, what measurement basis is appropriate, during what measurement window(s) and at what position(s) in space should a measurement be directed. As such, it is useful in methods according to the present teaching to share wavefunction information related to the quantum information that bounds and describes, in a classical and/or deterministic manner, these and other characteristics of the quantum information.

The need to quickly and/or easily identify and/or verify and/or describe properties of the quantum information in a quantum system in a way that classical systems can process and use is important to numerous applications that use quantum information. As one application example, for some quantum metrology applications, each photon in a set of entangled photons can carry state information that is entangled such that the values of those states are the same when measured. For optical measurement applications, the correlation of entangled photons, specifically in a phase dimension and/or a time dimension, can produce very precise time and/or position measurements. As another application example, for optical imaging applications, the non-local correlation of entangled photons can be used to provide a point-to-point image correlation between optical detections at an object plane and an image plane. These measurement and imaging applications require the timely and accurate identification of photons that are part of a set of entangled photons in order to know the measurements using the photons of the set are correlated. These applications also need to know information about when, where and how the quantum information will be presented to the application so the information can be used efficiently and effectively.

It is useful to review important characteristics of quantum information systems. In quantum information systems, a measurement of a quantum state in a quantum form collapses the associated quantum states in an irreversible way. The resulting measurement result is quantum information in a classical form, but it lacks some of the qualities it had in its former quantum form, like superposition. For example, the detection of a photon state (or measurement of an atomic state) yields a value of one of the possible quantum states of the photon (or the atom). At this time, the possibilities (or the superposition) are no longer manifest. Quantum resources can be quantized such that their states take on only specific and/or singular values. This is different from classical systems that can produce continuous values of states, such as systems that use large numbers of photons and associated analog opto-electronic detection of those photons for measurement or communication. Finally, entangled quantum resources carry perfectly correlated state information, and that correlation persists across time and space. Some embodiments of metadata management for quantum information system and method of the present teaching use the metadata to determine where, when and/or how the quantum state information is being presented to the quantum application.

Because many well-known, low cost, sources of entangled photons generate orders of magnitude more photons that are not entangled compared with photons that are entangled, it is necessary to provide information about which particular sets of photons are entangled, and which are not. It can be said that entangled pairs or entangled sets of photons are generated within a sea of noise photons that are not entangled. In addition to the entangled photon generator itself, other photon sources can generate ambient background photons that also are not entangled. This can be, for example, ambient light, purposeful interference from a $3^{rd}$ party, amplifiers, receiver dark counts, and other sources in any channel between the source of the photons and detectors. Consequently, for many practical systems, the photons that are not entangled must not be erroneously identified as entangled. Quite different from classical situations, methods and apparatus of the present teaching can find and process quantum information that is surrounded by very high noise. This is in contrast to classical optical detection and measurement systems that reach a point of noise where it is not possible to detect and process an optical image signal or measurement signal once the signal level falls sufficiently below a noise level. One feature of the present teaching is a configuration of a metadata management system for a quantum information system and a method that uses the metadata to identify entangled photons, and/or associated entangled quantum state information, in the presence of high noise.

Some quantum information systems are sensitive to losses. As an example, a lost photon in an entangled set of photons can create an error condition that can be exhibited after measurements. There is an expectation that a correlated state value at one location from measurement of one of the photons in the set has a correlated pair state value at a second location from measurement of another photon in the set, and when this measured state value is not present, an error in the correlated data sets occurs. Accordingly, some embodiments of metadata management for a quantum information system and method of the present teaching use the metadata to detect and correct for errors. If an error condition for a particular measured state is not identified, this can serve to verify that measured state as a known good state.

FIG. 1 illustrates a diagram 100 showing different categories of quantum information used to describe the embodiments of the method and system of quantum information system management using metadata according to the present teaching. For purposes of describing the present teaching, we describe two different forms of quantum information: quantum information in a quantum form 102 and quantum information in a classical form 104, 106. Quantum information in a quantum form 102 includes quantum information in a potential state 108. Some refer to a potential quantum state as "res potentia", that is, offering possibilities. Examples of a potential state include a coherent state, a superposition state, a quantized state and an entangled state. These are quantum states that have these known quantum properties 110.

Generally, a potential quantum state can be a state that is unknown and/or not yet measured. While the potential state has multiple possibilities, a characteristic of quantum states is that only one of multiple possibilities is measured in a particular basis when the quantum system is collapsed. As one example, following the well-known "Schrodinger's cat" example, the state of possibilities dead/alive 112 of the cat in the box is quantum information in a quantum form. As another example, a set of interarrival times, delta-Ts 114, in a stream of entangled pairs emitted from a down-conversion source is quantum information in a quantum form. As another example, a potential of one of two polarizations, H/V 116, in polarization entangled photons is quantum information in a quantum form. Other examples include angular momentum values, atomic spins, and other known quantum potential states that occur in numerous quantum physical systems.

We also use the term quantum information to include information in a classical form 104, 106. This type of quantum information in a classical form can include measured state value information 106. That is, state value information in a measured or collapsed state. This kind of measured state value information 106 is, for example, the outcome of a measurement of potential state that yields a particular state value (e.g., one of the possible superposition states). Referring to our previous examples, this includes, for example, finding the cat dead 118, finding the cat alive 120, measured interarrival times 122, a measured V polarization 124, a measured H polarization 126, 128. We note that these measured values arise from the unknown quantum information in a quantum form 102, and so they can exhibit randomness properties.

We also use the term quantum information in a classical form to include information that is deterministic information 104 about the quantum system. As one example, wavefunction information 130 can be a deterministic description that bounds and/or provides the evolution of a potential state of a quantum system. For example, a polarization entangled system can be prepared in a particular polarization basis 132, and that which-basis information 132 is useful to assist the system in making a measurement of quantum information. In the Schrodinger's cat example, what box the cat is in and when that box was prepared 134 are examples of deterministic information 104.

An important characteristic of the different kinds of quantum information of the present teaching is how they are connected or related. For example, the deterministic what-box-when information 134 can correspond directly to a system with a cat in a dead/alive quantum form state 112. A system that measured an H 128 polarization value can correspond to the particular polarization basis 132 of the wavefunction information about the entangled photon preparation system. Measured state values quantum information 106 have a key property to which they can correspond directly, that is, measured state values can have a one-to-one correspondence that can be non-local. For example, a measured set of H, V polarization values 136, can correspond directly to a set of interarrival times 122.

Although both the measured states information 106 and the wavefunction information 104 are quantum information, they differ from the quantum information in the quantum for 102 in that they are classical in nature. We refer to both the measured states information 106 and the wavefunction information 104 as quantum information in a classical form. For one thing, quantum information in a classical form includes parameter values that are actual or known, as opposed to being potential or unknown. Also, quantum information in a classical form has the important practical feature that it can be communicated over classical channels and used and/or processed by classical information systems, including classical memory, CPU, analog and/or digital processors, and a variety of classical sensing and measurement systems that may be analog and/or digital in nature, without any fundamental change to their properties.

It is important to emphasize that quantum information in a quantum form 102 has certain quantum properties, e.g. quantization, superposition, non-locality, correlation, coherence and combinations of these qualities. A quantum potential state description applies when the system is coherent or still in superposition. A notable quality of the potential state is that at least some of the quantum state information is not known. Once the carriers of quantum state information in a quantum form, e.g., photons, atoms, ions, and superconducting junction currents, are measured to yield the quantum state information, the states of those carriers are collapsed, and therefore yield measured quantum state information in a classical form 106. This measured quantum state information 106 is classical in nature, and can be further processed in a classical way. Still, it is intimately connected to the quantum nature of the potential state that was measured, which is why it is referred to herein as quantum information. Examples are non-locality and correlation properties that are characteristic of quantum information in a classical form. These properties are not possible with purely classical information derived from classical systems.

In addition to the above description of the different forms of quantum information, quantum and classical, it is important to consider how the systems and applications use the quantum information. Some applications and systems that use quantum information use a portion of the quantum information they intake to directly process, store, measure, sense and/or communicate. We refer herein to this portion of the quantum information as the quantum data 138. Another portion of the quantum information the applications and systems intake is used to aide in the processing, measuring, sensing and/or communicating of the quantum data. We refer herein to this portion of the quantum information as the quantum metadata 140.

The quantum data 138 and quantum metadata 140 terminology described herein is analogous to the use of the terms "data" and "metadata" in information technology. That is, metadata refers to information about the data, as opposed to the data itself. However, it should be understood that the portion of quantum information that is considered quantum data 138 and the other portion of quantum information that is considered quantum metadata 140 is determined at least part by the application or system that is using the quantum physical system. It should also be understood that whether quantum information is in a classical form 104, 106 or a quantum form 102, it is determined at least partly by the particular quantum physical system. It is important to understand that the definitions or categorizations of what information is quantum metadata and what information is quantum data can change from one application to another, or for different operations within the same application. We also note that metadata 140 can be split into collected metadata 140 and shared metadata 142. This distinction can be important especially in privacy and secrecy applications where the inherent no-cloning, quantization and/or randomness properties of quantum states are valuable. In these applications, shared metadata 142 can be communicated over public channels.

References herein to classical information, or information in a classical form, include information that can be used by classical information systems. As such, this includes general classical information that is naturally or by its origin in a classical form and can also include quantum information in a classical form.

Referring to the examples in the diagram 100 of the quantum data 138, we see some of the data 138 can be in a quantum form 102. This region is labeled with a 1. This kind of quantum data can be consumed by a quantum process. For example, this kind of data could include photons that still carry entangled state information, that are sent down fibers or through telescopes to receivers that are configured to measure their state information. This kind of data can also be quantum states preserved in a quantum memory. This kind of data can also be qubits in a quantum processor that are undergoing unitary transformations. A key aspect of this quantum data is that it remains res potentia. It has not decohered and it has not yet been measured. Such data can still be characterized by various known fidelity measures, and yet still maintain coherence. As such the quantum data of the region 1 can be characterized, just not having its quantum state values measured.

There is also quantum data 138 that can be in a classical form 106. This region is labeled with a 2 in the diagram 100. These are, for example, measured quantum state values that are used as data by an application. This can be, for example, measured list of polarization values, arrival time, position, momentum, phase, wavelength and/or other measured parameter values. These data values can represent bits, e.g., 1, 0 for two polarizations, or continuous values, our discrete values. These values can be used for communications, measurement and/or processing by an application.

The diagram 100 includes a region labeled 3 of collected metadata 140 that includes measured quantum state values that are used by an application as information about some related quantum data also used by that application. As in the quantum data case of region 2, described above, this metadata can be, for example, measured lists of polarization value, arrival time, position, momentum, phase, wavelength and/or other parameter values. Being used as collected metadata, region 3, the measured state values can be used to identify members of entangled sets, reduce latency of quantum data exchange and processing, improve robustness to background, and correct errors. As in the example described above where a measured set of H and V values 136, can correspond in a one-to-one manner to a set of interarrival times 122, the correlation leads to identification. More specifically in regards to this example, and referring to region 4 of the diagram 100, which includes collected metadata that is measured state values shared by sharing lists of H and V values 136, local nodes can identify particular interarrival times 122 as being entangled.

Collected and shared metadata in a classical form can also be deterministic information 104. Region 5 of the diagram 100 includes wavefunction and/or environmental information about the quantum system. Part (or all) of this information can be shared, as indicated by region 6. Wavefunction-based quantum metadata described deterministic bounds of the system. This includes, for example, start-stop, or window information about when and where the quantum states are generated and transported. This also includes bases of the quantum information, superposition outcomes, type of processing performed, entanglement properties, and other information. A characteristic of the wavefunction information is that it is in a classical form, and, though it may evolve during a lifecycle of the quantum state information generation and measurement, it can be associated with a quantum state or set of quantum states all the way through the lifecycle. Wavefunction information does not, necessarily, reveal specific quantum state values, but rather bounds the values. Environmental information can be in the collected metadata region 5 or shared metadata region 6. This kind of information also is associated with quantum states through the lifecycle, and can lend information on, for example, how pure or coherent is quantum information in a quantum form, or how that information needs to be measured to provide a desired error rate in finding the state value.

Many examples of quantum information system management using metadata described herein describe photonic quantum systems. However, it is understood that aspects of the present teaching can apply to resources of numerous quantum systems including, for example, entangled atomic systems, ionic systems, spin systems, superconducting systems, quantum dots, and other systems. In these configurations, the quantum state information, and associated quantum metadata concepts remain the same, but the physical system that carries the state, as well as in some configurations the different entangled bases, is different as understood by those skilled in the art. The teaching can also be applied to hybrids of these and other systems. In addition, numerous embodiments described herein illustrate entangled quantum sources. However, it is understood that aspects of the present teaching apply to systems and methods that do not generate entangled quantum states, but atomic and/or photonic quantum states in a quantum form that are not entangled but possess other quantum properties.

One feature of the quantum information systems using metadata of the present teaching is that it enables the use of quantum correlated data in a much broader context than either the scientific experiments or the relatively closed quantum communication, quantum key distribution, and quantum sensing systems known in the art. It has been discovered that by appropriately tagging quantum data in either a classical form or in a quantum form, it is possible for many different systems and applications to use that quantum data. As one example, it is possible to effectively extend the time and/or space between nodes that are sharing and/or using the quantum correlated data. This extension can be because quantum information systems using metadata of the present teaching do not necessarily need closed-system timing or any type of synchronization to be able to identify correlated data. This extension can also be because quantum information systems using metadata of the present teaching do not necessarily need to carefully track, or even track in real time the arrival of the quantum carriers. This is because metadata as described herein can be used to determine the correlated data well after measurement, and far removed from, e.g., a particular quantum detector that made that measurement at a different time and place. This extension can also be because, in some cases, it is no longer necessary to pre-assign or carefully assign where entangled resources are delivered, as the correlation and/or metadata allows nodes to identify with which other nodes their data is correlated.

Considering this, it can be said that quantum information systems using metadata of the present teaching enable a more connectionless, packet-oriented style of quantum information system. This means that these systems can use existing widely available networks such as the Internet to manage quantum information. The quantum information systems using metadata of the present teaching can use classical connectionless, packet-oriented Internet protocol communication systems, and the classical connection-oriented traditional telecom protocol communication systems. In contrast, known quantum communication systems operate in a connection-oriented fashion and/or with careful end-to-end synchronization and well-defined and/or stationary endpoints or nodes. The present teachings relax these requirements by leveraging existing networks.

The quantum information systems using metadata of the present teaching enable systems, applications and/or users of various kinds to use either or both of quantum information in a quantum form and quantum information in a classical form. In general, classical form quantum data is highly compatible with almost all information processing systems and networks, and does not require specialized environments or controls and monitors to ensure fidelity. One feature of the methods and apparatus of the present teaching is that they use quantum data in the quantum form when necessary and can advantageously use quantum data in the classical form when possible. As such, the system and method of the present teaching supports far less complex, much lower cost systems that are more backward compatible with existing systems. An important aspect of the present teaching is that it will allow wide-spread adoption of quantum information systems without the wholesale replacement of existing infrastructure. Quantum capable channels are extremely noise sensitive, range limited, and costly. Classical networks are ubiquitous, encompass most of the world, and are widely available to everyone. Thus, the systems and method of the present teaching allow for an incremental deployment of quantum links while leveraging this existing infrastructure.

One feature of the quantum information systems that use metadata of the present teaching is that the metadata can be used in the management of a distributed quantum cache system. Embodiments of these cache systems can include, for example, quantum caches that are described in U.S. patent applicant Ser. No. 17/306,850, entitled "System and Method for Quantum Cache", which is incorporated herein by reference and which is assigned to the present assignee.

Figure 2:
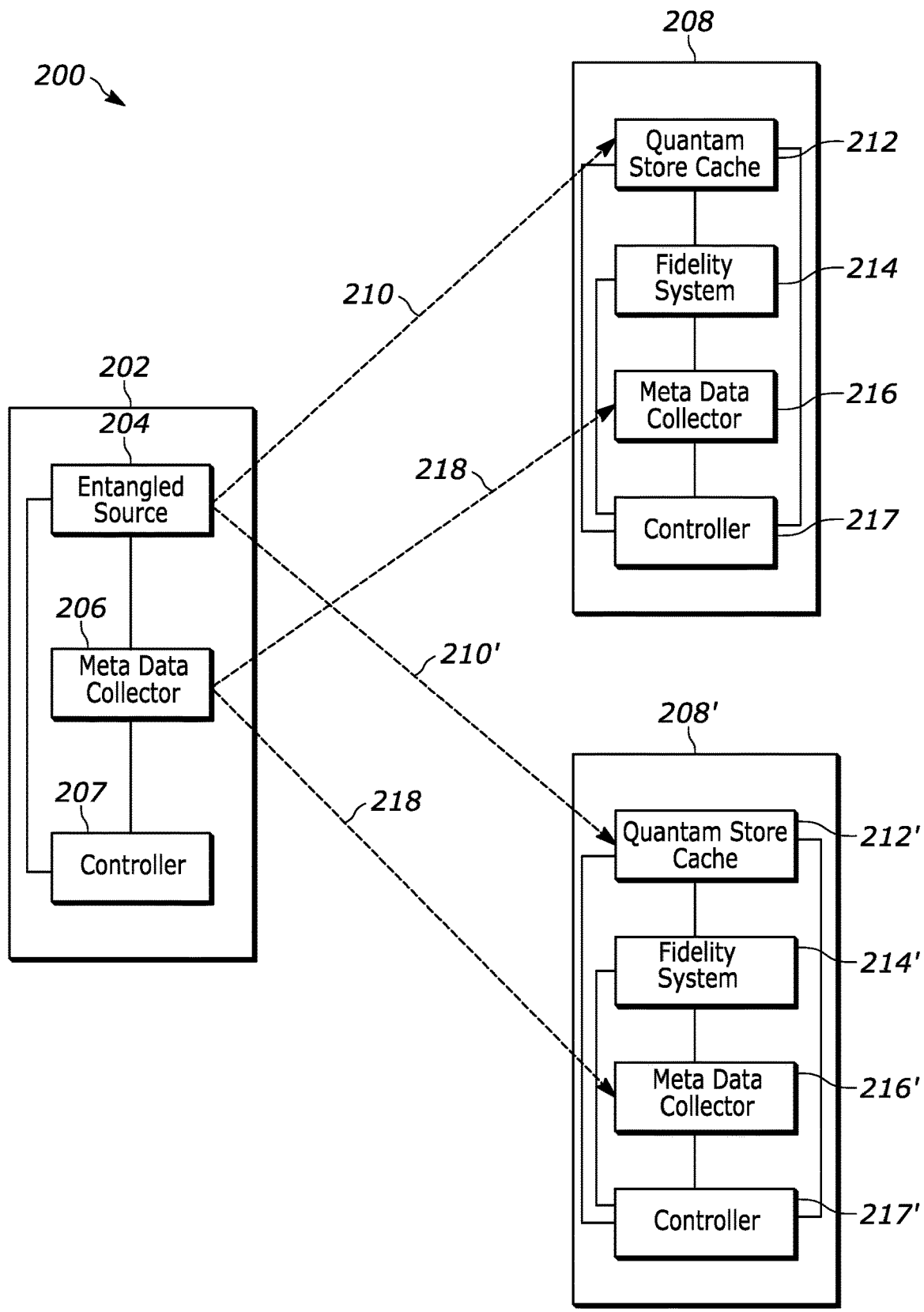
FIG. 2 illustrates an embodiment of a distributed quantum cache with metadata management system of the present teaching.

FIG. 2 illustrates an embodiment of a distributed quantum cache with metadata management system 200 of the present teaching. An entanglement server node 202 includes an entanglement generator 204, that can be an entangled source, that is connected to a metadata collector 206. The entanglement generator 204 transports generated entangled photons, or other type of entangled quantum state carriers, to nodes 208, 208' via quantum channels 210, 210'. Each node 208, 208' includes a quantum store 212, 212', a fidelity system 214, 214' and a metadata collector 216, 216'. The state values of carriers that are entangled are one example of correlated data. That data is in a quantum form before measurement, and in a classical form after measurement. That is, the data in a quantum form can be considered correlated data even though its specific values are not known. In various embodiments there may be more than two nodes. The nodes 208, 208' communicate via a classical channel 218. In particular, the metadata collectors 216, 216' and the fidelity systems 214, 214' communicate over this channel 218, thus allowing the sharing of quantum information in a classical form that includes quantum metadata. A controller 207 in the entanglement server 202 is connected to the metadata collector 206 and the source 204 so that metadata information can be used to control the source. The controller 207 may also be in communication with other controllers 217, 217' to share metadata. Controllers 217 217' in the nodes 208, 208' are connected to the collectors 216, 216', the fidelity systems 214, 214' and the stores 212, 212' to provide control signals to the elements based on the metadata.

Some embodiments (not shown) have different metadata collectors 206, 216, 216' connected to different controllers 207, 217, 217'. That is, the metadata controller collecting metadata information from the source 204 can provide that information directly to, for example, the controller 217 in node 208. That is, the present teaching is not limited to a particular location of the metadata collector and the elements that control and/or detect and/or store and/or otherwise process the quantum information. In various embodiments, the metadata collector is positioned and connected in a way that allows it to collect pertinent metadata and provide that metadata to elements that control or process the quantum information in a way that benefits the quantum system as described herein.

The server node 202 metadata collector 206 can collect metadata about the source 204. For example, some embodiments of the entanglement server 202 use a deterministic source 204 of entangled photons and the metadata collector 206 includes metadata comprising the time window of specific entangled photons. Some embodiments of the entanglement server 202 use a non-deterministic source 204 of entangled photons and the metadata collector includes metadata comprising the time window when entangled photons probabilistically appear and when they do not. For example, time windows can be formed when a pump source that generated entangle photons is on versus when the pump source off. In general, with entangled sources 204, it is possible to provide a time window, including a repetitive time window for which an entangled photon pair will be provided with some probability at a particular position in the system. It is also possible to specify that only 1% of the time windows would have faulty quantum states (e.g. more than one photon) which all can be metadata about the quantum information in its quantum form generated by the source 204 and collected by the metadata collector 206 and shared with nodes 208, 208'. As an example, if a time window during which a measured quantum state is measured does not align with a time window when a pump source generates photons, then that measured state can be considered in error. That is the state is not a verified measured state. This measured state can then be discarded before its use in the quantum information system, making the system more efficient.

In addition, it is possible for the metadata collector 206 to provide data in a classical form associated with the quantum data in a quantum form produced by the source 204. Data can include a number of indistinguishable events (e.g., identical photon states) that will follow a prepared excitation state, an expected fidelity (dephasing, added background), and other associated classical information about the entangled photons that allow the source 204 to be generally described. The classical information can then be shared by the metadata collector 206 to the nodes 208, 208'. The metadata can be tagged to an individual entangled photon event or to a larger set of events, depending on the source 204. One feature of the present teaching is that the classical tagging process allows multiple types of sources to be used in the same system. That is, the metadata allows quantum information in a quantum form generated by two or more different sources to be individually tagged with metadata that describes the quantum information in a quantum form. This quantum information in a quantum form can occur, for example, at different times, different places, having different colors, and/or with different entangled basis. These qualities are tagged with metadata so that quantum information can be effectively used. The tagging can be used to track entanglement and where and when particular entangled states are manifest and as such allow distributed and/or networked systems to be controlled and managed to efficiently and effectively share entangled state information. Tagged information can be kept local, for example in a node, and/or tagged information can be sent to other nodes, in all or in part. The term "tagging" as used herein in this context means providing an assignment between the metadata and the state information that can be used by information processing systems and/or users, and can be used in connection with storing, and/or sending the information. Tagging for various embodiments of the present teaching can be implemented using various known formats and structures that represent the metadata and the quantum information that is tagged.

One feature of the present teaching is that tagging for tracking quantum information, can be measured quantum state information, for example, benefits numerous applications that use quantum information. For example, in quantum sensing applications, tracking can pair measured values from two entangled photons to determine the impact of the transduction. For ghost imaging, tracking can be used to match bucket photons with sensor array photons. For location and various time synchronization application, tracking can help identify single or large groups of paired photons used to derive time and/or location. For communication applications, such as dense coding applications, tracking can pair idler photons with signal photons. In these and other cases, tracking can remove or reduce the effect of background signals that are, by design, not tagged. Tracking can also be used for various distributed and/or networked quantum systems and the applications they support. Tracking can be used to coordinated addresses that connect different nodes. Tracking can be used to determine between which nodes a secret is shared, in some cases beneficially without sharing any data at all that relates to the secret. These are just examples, and other known applications and systems that use quantum information can benefit from the tracking capability provided by different kinds of metadata tags, and specifically metadata tags that are based on where and when information.

In some embodiments, the entangled source 204 can be electronic and can generate entangled electronic qubits that are transmitted electronically. The entanglement generator 204 can also be optical. For example, the entanglement generator 204 can be an entangled photon source that generates entangled photons. The quantum stores 212, 212' include fidelity systems 214, 214' can include a mechanism for determining the coherence of qubits at each node. As examples, coherence can be a metric of the degree of entanglement and/or coherence can be a metric for the quality of a superposition state. The fidelity systems 212, 212' are in communication with the metadata collectors 216, 216' to provide coherence metadata about the photons in the respective quantum stores 212, 212'. Coherence metadata is shared on the channel 218 between the nodes 208, 208'. Coherence metadata is important because if one photon has decohered in one node 208 to the point where it needs to be discarded, then the corresponding entangled photon in node 208' must also be discarded. This explanation applies similarly to entangled atomic states.

The quantum entangled stores 212, 212' also include a synchronization mechanism that ensures matched pairs or sets of qubits are in use at the nodes 208, 208'. The synchronization may, for example, be associated with a particular known order of qubits in the cache that is associated with, or registered to, another order of qubits in another node. In some embodiments, the synchronization mechanism is achieved by using an ordered quantum store 212, 212'. The order, or other synchronization information, can be another type of metadata used and communicated by the metadata collectors 216, 216'. The matched pairs or sets of qubits are then considered correlated data.

As one specific example, the entangled source 204 generates a pair of entangled photons that are transmitted over channels 210, 210' that could be free space or fiber channels. The metadata collector 206 generates metadata associated with that pair which can include the time window they were generated in and/or the basis, or bases, in which they are entangled (e.g., time, polarization, wavelength, position). The metadata collector 206 sends the metadata to the nodes 208, 208' over the classical channel 218. The photons are received and loaded in the quantum stores 212, 212' at each node. The associated metadata collectors 216, 216' generate metadata about when the photons were loaded, and how long they have been in the store 212, 212'. The associated metadata collectors 216, 216' generate metadata that includes an index indicating which node the local photon is entangled with. The metadata collectors 216, 216' also know when via loss or other mechanism like time, the stored photons have aged out. The metadata collectors 216, 216' can maintain that as age-out metadata that can be used to discard (or not use) photons that are no longer good or have been lost.

Thus, a distributed quantum cache with metadata management system 200 of the present teaching can include quantum information in a quantum form as entangled photons carrying quantum state potential information in more than one basis. The potential entangled state is quantum data for the system and is stored in the stores 212, 212'. The distributed quantum cache with metadata management system 200 of the present teaching includes quantum information in a classical form as metadata that is tagged to the quantum data and includes time-window information, basis type information, and age-out information. So-called where-and-when information, which is part of the metadata, can be used by the system to inform a quantum store 212, 212' when and/or where to load a store and/or a measurement system when and/or where to make a measurement, thereby collapsing at least part of the quantum information in a quantum form to generate quantum information in a classical form. In some embodiments, this generated quantum information in a classical form is one example of correlated data generated using the metadata.

Thus, metadata can advantageously describe one or more of when the quantum stores should load and unload, how to measure the quantum state, how the measured quantum state values are related, when the quantum information in a quantum form is no longer valid or useable. By having the when and where information, it is possible to determine error conditions. For example, if the when and where information indicates a quantum state carrier should not be at a position at a time, and a state value is measured, that measurement can be considered and error. While the actual values of quantum information in a quantum form are not known, for some types of quantum systems, the when and where information is deterministic, which allows the when and where information to be part of the error detection and/or error correction process. The foregoing description is just a few examples of types of quantum metadata and quantum data and how they can be advantageously used in quantum information systems that include caches or some form of storage. Thus, the distributed quantum cache with metadata management system 200 is easier to manage and control than a quantum cache that does not generate, communicate, and/or process metadata.

One feature of the present teaching is that it provides simplified management and efficient quantum information sharing for quantum information systems that share entangled quantum state information. These systems can include quantum entangled information sharing systems that generate and use measurement combs to identify entangled photons in the system. This could be, for example, embodiments of the system and method described in U.S. patent applicant Ser. No. 17/465,235, entitled "Method for Synchronizing and Locking Clocks", which is incorporated herein by reference and which is assigned to the present assignee.

Figure 3:
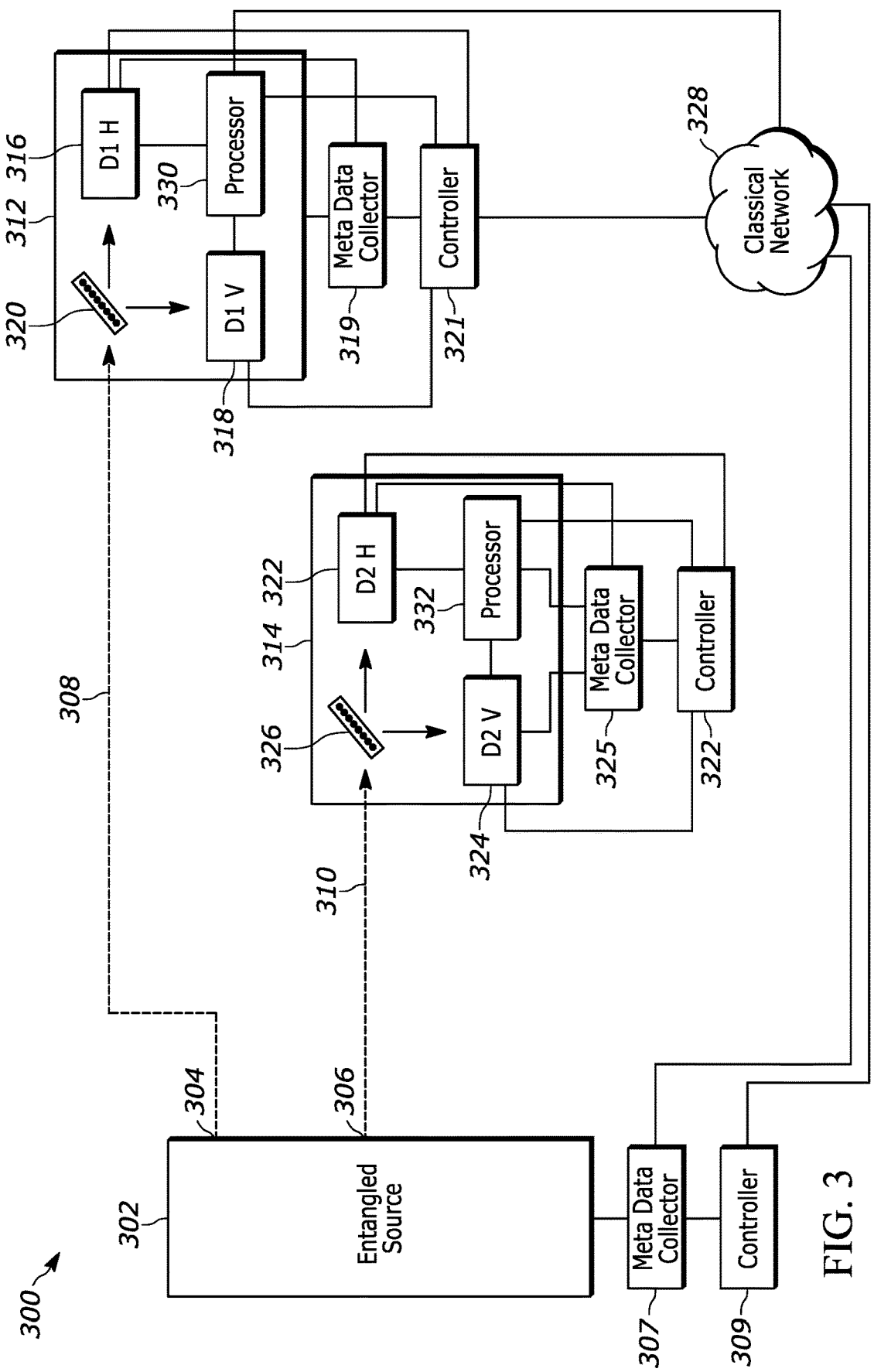
FIG. 3 illustrates an embodiment of a distributed entangled quantum state information with metadata management system of the present teaching.

FIG. 3 illustrates an embodiment of a distributed entangled quantum state information with metadata management system 300 of the present teaching. This embodiment of the quantum entangled information sharing system 300 is a simple example where two remote nodes are able to share correlated polarization values that are derived from entangled photons by sharing measurement combs that do not contain any polarization information. These correlated polarization values are one example of correlated data. A polarization entangled source 302 produces entangled pairs that emerge from a pair of ports 304, 306. One of a pair of entangled photons will appear at the first port 304, and the other will appear at the second port 306. Photons emerging at the first port 304 can be entangled in time and polarization with photons that emerge at the second port 302. In some embodiments, the source 302 is not an entangled source, and rather produces quantum information in a quantum form at either or both of port 304, 306 that is sent to one or more of receivers 312, 314 for measurement and subsequent processing. This quantum information can be measured and used directly as quantum data, which can be tagged with metadata from either of metadata collectors 307, 319, 325. For example, where and when information can verify that a measured quantum state is a valid, or error free, quantum state, so that information can be used directly and efficiently by a quantum system or application using the tagged measured quantum information.

We denote here the two polarization state values as H and V as understood by those skilled in the art as being orthogonal dimensions of polarization. While H is associated with a horizontal dimension and V is associated with a vertical dimension, it should be understood that these are arbitrary designations. Values of polarization are random variables that emerge from the source ports 304, 306. The measured values of the random variables are perfectly correlated from pairs. In the case of polarization for many embodiments, measurement of a value H for one photon in a pair produces a value V for the other measured pair. However, the polarity of the correlation is arbitrary, and depends upon particulars of a measurement configuration. The key is that measured values can be correlated to find a match.

A metadata collector 307 is connected to the source 302. The collector 307 collects metadata information about the source 302 and generated photons including time windows when entangled photons are produced, and polarization basis information. A controller 309 is connected to the metadata collector 307 and the source 302 and uses the metadata from the collector 307 to control the source 302. The controller 309 is connected to other controllers 321, 329 in the system 300. In some configurations, the connection is via a classical network 328 to share control information, but numerous known connections can be used.

The photons are routed over optical paths 308, 310 to two receivers 312, 314. The optical paths 308, 310 can be free space paths or any kind of guided paths, such as a fiber optic links or integrated optical waveguides. It should be understood that the numerous applications of the methods and apparatus of the present teaching can require optical paths that are very short for use in, for example, integrated components and/or mini-free-space optical bench systems. Also, the methods and apparatus of the present teaching can require optical paths that are relatively short for use in, for example, a data or computing center. Also, the methods and apparatus of the present teaching can require optical paths that are relatively long for use in, for example, applications requiring a long-distance terrestrial, undersea link and/or satellite link. That is, depending on the application, the optical paths 308, 310 can be on order of microns to on order of many thousands of kilometers.

The first receiver 312 includes a first single photon detector 316 and a second single photon detector 318. The detectors 316, 318 have inputs that are positioned in the optical paths of the outputs of a polarization beam splitter 320. The polarization beam splitter 320 is oriented to pass H-polarized photons to the input of the first detector 316 and to pass V-polarized photons to the input of the second detector 318. The first receiver 312 includes a metadata collector 319 that is connected to the detectors 316, 318 for determining and sharing metadata information about the measured photons. For example, the collector 319 can monitor which input a particular photon is received at (only one is shown) and use that information to determine where a photon is arriving from. The collector 319 can receive information from other metadata collectors, e.g., metadata collectors 307, 325, about when and where particular photons arriving at the receiver 312 are from. In some embodiments, metadata can be derived from circumstances or environment (e.g. a node is in a particular point in space and time), or it can be explicitly provided by a system controller or other party. The meta data collector 319 can provide metadata to the controller 321 and/or processor 330 and the controller 321 and/or processor 330 can tag measured quantum data to associate the measured data with other measure data that it is entangled, and therefore correlated, with. This tagging information can be used, for example, to coordinate addresses across nodes, or generate secret information between nodes. In general, the metadata can indicate which entangled state is entangled with which other entangled state either before or after measurement of those states. The receiver 312 also includes a controller 321 connected to the collector 319, the processor 330 and the detectors 318, 318 and the classical network 328.

The second receiver 314 includes a first single photon detector 322 and a second single photon detector 324. The detectors 322, 324 have inputs that are positioned in the optical paths of the outputs of a polarization beam splitter 326. The polarization beam splitter 326 is oriented to pass H-polarized photons to the first detector 322 and to pass V-polarized photons to the second detector 324. The second receiver 314 includes a metadata collector 325 that is connected to the detectors 322, 324 for determining and sharing metadata information about the measured photons. The receiver 314 also includes a controller 325 connected to the collector 325, the processor 332 and the detectors 322, 324 and the classical network 328. The collector 325, the processor 332 and the detectors 322, 324 of the second receiver 314 are similar to the collector 319, the processor 330 and the detectors 316, 318 of the first receiver 312.

The two receivers 312, 314 are also connected via a classical network 328. In various embodiments, the classical network 328 can be any of a variety of known networks. For example, the networks can be fiber optic networks, wireless networks, satellite networks, free space optical networks and/or combinations of these networks. A key feature is that it is not necessary that the networks have any particular performance characteristics, such as latency guarantees, timing and/or synchronization requirements, packet loss performance and other known network performance metrics.

In some configuration of the system of the present teaching, the receivers 312, 314 have information on timing of every or essentially every photon arrival. This information can be through a combination of arrivals detected in the detectors 316, 318 or detectors 322, 324 in a given receiver 312, 314, as well as the polarization of each arrival. For example, the detectors can be configured to generate an electrical signal in response to receiving a single photon in a first state of polarization at a particular time. This allows the measurement of both the time of arrival (TOA) and the polarization state. Some or all of this information may be included in the comb generated by the processor 330, 332 and shared. That is, the processors 330, 332 can process the electrical signals from each detector, that includes information regarding arrival time of a photon and a polarization state for each measured photon, in a way that uses some or all of the measured state information as needed by a particular comb for a particular application. Combs can, for example, include, a list of times of arrival (timing comb) and no polarization state information, and/or a comb may be generated to include polarization values and time of arrival. A sequential list of polarizations may also be generated using the single photon events captured by the detectors 316, 318, 322, 324. Combs can also include metadata associated with the measured state values. In general, combs that are shared are metadata that are measured state values.

The system 300 of FIG. 3 can be used for applications that share a random secret. In this application, one of the pair of entangled photons arrive at the D1 receiver 312. After passing through or being reflected by the polarization beam splitter 320, they are detected by either detector D1H 316 or detector D1V 318 based on their polarization. The time of detection and the polarization are recorded in a timing comb generated in processor 330 as described herein. In this case the quantum data is the polarization state, and the time of arrival information is quantum metadata. The other of the pair of entangled photons arrive at the D2 receiver 314. D2's polarization beam splitter 326 is oriented for the same basis as D1's beam splitter 320. When the other of the pair of entangled photons strike the polarization beam splitter, it is routed to either detector D2H 322 or detector D2V 324 based on their polarization. The time of detection of and the polarization are recorded in a second timing comb generated in processor 332 as described herein. The polarization information is quantum data in this application and the interarrival times are the quantum metadata information associated with the measurement of one of the pair of entangled photons in the node 314.

Processor 330 in D1 receiver 312 shares its timing comb metadata over a classical channel provided by the classical network 328 with just a mark indicating windows where a detection occurred and not the polarization measured for the photon that is sampled at the mark. Processor 332 in D2 receiver 314 then compares its generated comb in time through the comb generated by processor 330 and counts the number of correlated detector hits. When the number of correlated detector hits is maximized, a match is found and processor 332 in receiver D2 314 uses its measured polarizations in those bins as the correlated data which becomes the shared secret.

It is understood by those skilled in the art that either receiver 312, 314 can perform the process of comparing combs to determine a maximum number of matches. As understood by those skilled in the art, if a fixed path length offset is established between the two nodes, then the time position, or relative offset, determined by the finding of the maximum in the auto-correlation tracks any changes in the relative path length. Thus, the combs of the present teaching can be used to determine relative positions, or relative changes in path length from source 302 to receiver 312, 314 in the system 300.

The particular configuration of the receivers 312, 314 that include a polarizing directing element 320, 326 is just one specific example. The receivers may be constructed more generally so long as each detector generates an electrical signal at an output in response to receiving a single photon in a particular state of an entangled system's possible states.

One feature of the present teaching is that a verification using metadata that measured quantum information in a classical form is valid benefits numerous applications that use quantum information. For example, in quantum sensing applications, validating a measured quantum state allows that state to be used confidently and efficiently for sensing. For ghost imaging, validation of a measured quantum state means that the state should be included in an image, and discriminates it from noise events or other cases where the quantum information is invalid such as if it appears inconsistently with where and when information. For location and various time synchronization application, validations allow single, or large groups, of paired photons to be used directly to derive time and/or location. In these and other cases, validation with the metadata can remove or reduce the effect of background signals that are, by design, not validated at least because they are not consistent with, or properly associated with, the metadata information.

Verification using metadata information associated with quantum information in a quantum form and/or quantum information in a classical form can also be used for various distributed and/or networked quantum systems and the applications they support. Verification can be used to verify addresses that connect different nodes. Verification can be used to share secret quantum state information between nodes with high reliability even in the face of background measurements. These are just examples, and other known applications and systems that use quantum information can benefit from the verification capability provided by different kinds of processing to verify the quantum state. For example, error determination processing, or where and when consistency processing, as well as other processing.

Information in the electrical signal generated by each detector includes the arrival time of the single photon. This is true whether the arrival time is an entangled resource and, therefore, non-deterministic and also can be an example of correlated data, or the single photon arrivals are deterministic. Because each detector's measurement of a photon includes arrival time and an additional state value of the detected photon, the processor can produce a sequence of measured states based on the order of arrivals and this sequence does not include the arrival time intervals. Thus, a comb sequence can be generated by a processor whether or not a particular time interval of photon arrivals is also included, as required by a particular application. As described herein, different comb sequences (i.e. different ordered lists of measurement events) that contain different measured variables are kept private, or local to a node, and other sequences are made public or shared with other particular nodes and can be used for correlation or matching with other combs. The particular quantum measurement information included in comb sequences kept private or made public or shared can also change over time and/or change depending on the particular application. The term "comb" refers to an ordered list of events generally. In various applications according to the present teaching public and/or private combs are used.

Thus, a distributed entangled quantum state information with metadata management system 300 of the present teaching includes quantum information in a quantum form as entangled photons carrying quantum state potential information as polarization and time of arrival. The distributed entangled quantum state information with metadata management system 300 includes quantum information in a classical form as metadata that is directly correlated with the quantum data as measured interarrival times. The metadata advantageously allows a comparison process to locally determine the particular measured polarization values without disclosing any polarization information. Metadata about the quantum information in the quantum form that is provided by the metadata collector 307 associated with the source 302 is used by the receivers 312, 314 so the controllers 321, 325 known when to start and stop measurement, and also can include polarization basis information that can change over time.

Where and when information about when the quantum information in a quantum form is generated and the evolution of where it is located that is part of the metadata can be used by the system to inform a detector or a measurement system when and/or where to make a measurement, thereby collapsing at least part of the quantum information in a quantum form. By having the when and where information, it is possible to determine error conditions. For example, if the when and where information indicates a quantum state carrier should not be at a position at a time, and a state value is measured, that measurement can be considered and error. While the actual values of quantum information in a quantum form are not known, for some types of quantum systems, the when and where information is deterministic, which allows the when and where information to be part of the error detection and/or error correction process.

For systems that share entangled states across multiple locations, the where and when metadata information further can provide information that can be used for coordination or indexing across the full set of entangled states. That is, the where and when information can indicate which photon pairs are entangled and where and when they are presented. That is, if one of a pair is in one node and a second pair in another, the metadata information can provide this connection. This can be useful to find measured state values at separate nodes that are correlated. This can be useful, for example, if entangled states are generated by multiple sources, so that the photon pairs from different individual sources are marked and can be tracked. In some embodiments, and index is used to track the associations. The index can include when, where and/or other information about the linkage between the entangled states.

These are just some examples of quantum data and metadata for entanglement sharing. For the forgoing reasons, it should be understood that the distributed entangled quantum state information with metadata management system 300 is easier to manage and control than a quantum correlated polarization value sharing scheme that does not generate, communicate and process metadata.

Referring to both FIG. 2 and FIG. 3, in some embodiments, a receiver, such as receiver 312 can be optically coupled to quantum store cache 212 and electrically coupled to controller 217 and metadata collector 216. A second receiver, such as receiver 314, can be optically coupled to quantum store cache 212' and electrically coupled to controller 217' and metadata collector 216'. In these embodiments, combs can be generated and used together with the distributed quantum cache 200.

One feature of the present teaching is that it uses metadata to make quantum information systems that are normally constructed with pairs of entangled photons and include an extra heralding photon to be more efficient and better support application that use the entangled photon information such as imagers, quantum measurement systems and quantum communication systems. This can include various embodiments of heralded quantum information systems that are described in U.S. Provisional Patent Application Ser. No. 63/327,892, entitled "Correlated Quantum State Identification System and Method", which is incorporated herein by reference and which is assigned to the present assignee.

Figure 4:
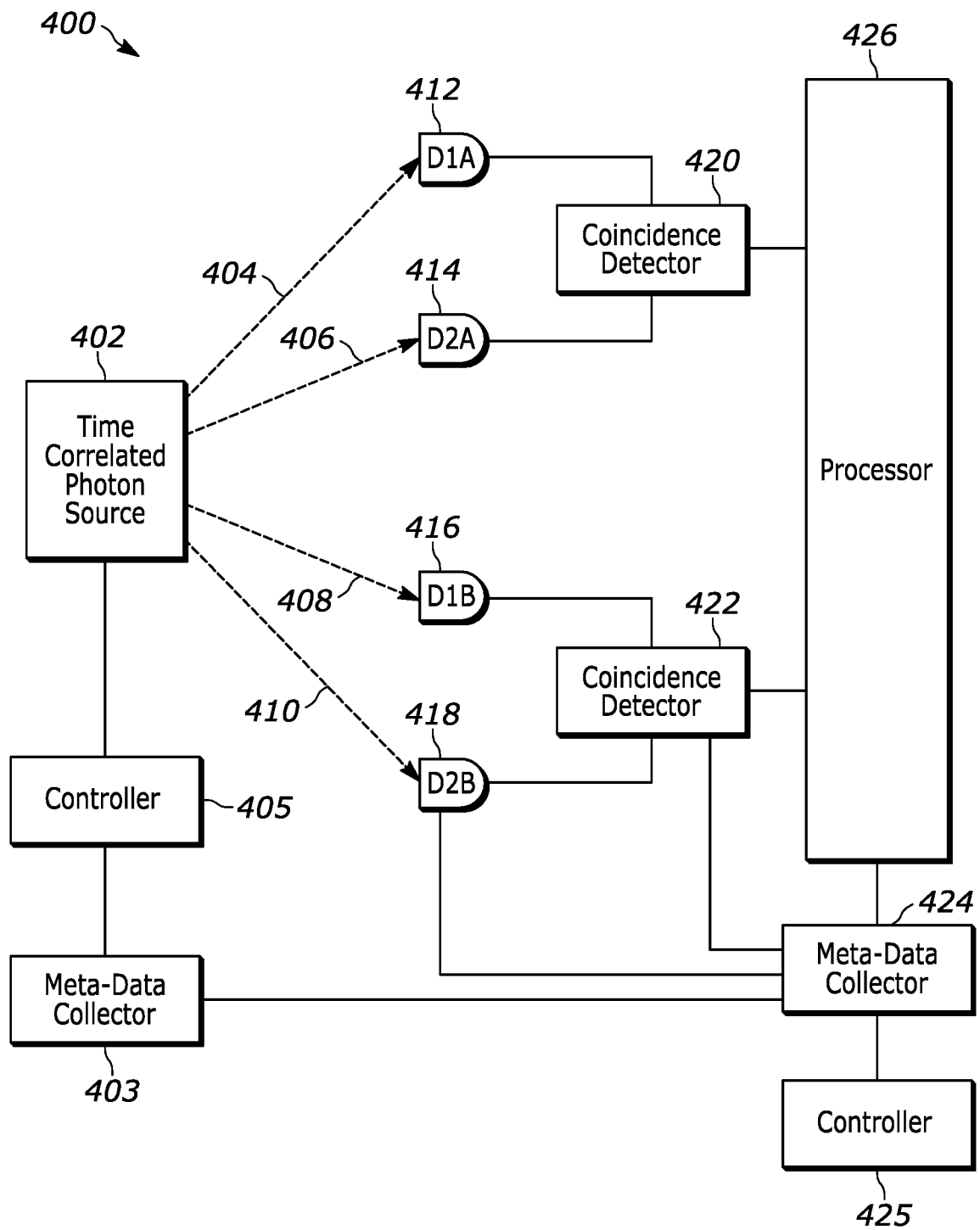
FIG. 4 illustrates an embodiment of a heralded entangled quantum state information with metadata management system of the present teaching.

FIG. 4 illustrates an embodiment of a heralded entangled quantum state information with metadata management system 400 of the present teaching. A time-correlated photon source 402 generates four time-correlated photons that emerge at four outputs and follow four paths, 404, 406, 408, 410 to four detectors 412, 414, 416, 418. The paths 404, 406, 408, 410 can be free space paths or any type of guided paths, such as ones guided by optical fibers and other types of optical waveguide. Two detectors 412, 414 are connected to coincidence detector 420, and two other detectors 416, 418 are connected to another coincidence detector 422.

In the heralded quantum information system 400, the source 402 produces four photons simultaneously. In some embodiments, two of the photons are directed to one location that includes the two detectors D1A 412 and D2A 414, and two photons are directed to a second location that includes two detectors D1B 416 and D2B 418. There is at least one local coincidence detector 420 at the location that includes D1A 412 and D2A 414, and a second local coincidence detector 422 at the location that includes two detectors D1B 416 and D2B 418. In some embodiments, the local coincidence detector can be as simple as a AND logic gate.

When the coincidence detector 420 finds a local coincidence at the location that includes D1A 412 and D2A 414 (in other words, determines there are simultaneous detection events at D1A 412 and D2A 414), a time-correlated photon pair has arrived. We note that the description assumes equal time-of-flight (TOF) from source 402 to detectors 412, 414, 416, 418 of each photon. The time correlation of sets of entangled photons ensures that when the location that includes D1A 412 and D2A 414 detects a local coincidence, the location that includes two detectors D1B 416 and D2B 418 will also detect a local coincidence. As mentioned before, much of the description herein assumes that latency from source to detector(s) is managed such that "coincidence" is synonymous with simultaneity. In any event, it is understood that difference is time of flight to detectors resulting from the speed of light can be accounted for using well known methods. In some embodiments, the local coincidences are stored locally and/or shared as combs.

In some embodiments, systems and methods according to the present teaching can compensate for arrival delays resulting from the speed of light when needed. There are various known approaches to addressing differences in latency from source to measurement that can be used with the systems and methods for identifying time-correlated photons in distributed systems of the present teaching. For example, if the time-of-flight is longer on link 404 than on link 406, or longer on link 408 than on link 410 than a known amount, the coincidence detector can be preceded by an appropriate fixed time delay in the connection between D1A or D1B to the coincidence detector. Generally, the concept of coincidence described herein can allow for the use of known methods and systems at the receivers and receiver nodes that correct for any time-of-flight different, detection time difference, or any other differential latency in the system that is delivering and measuring the photons that carry the quantum correlated states. Some methods according to the present teaching that identify time-correlated photons can be used to determine and correct some latency differences from source to detector(s). That is, in these methods identifying time-correlated photons includes compensating for time delays, even unequal time delays, in the determination of the coincidence. This can include, for example delays such as time-of-flight delays, detection latency, circuit latency, signal processing delays, optical measurement latency, etc. Other methods of determining coincidences according to the present teaching are so robust that they not compensate for even unequal time delays because they have at least some time independence in the measurements.

Detecting a local coincidence at location associated with D1A 412 and D2A 414 means the location that includes two detectors D1B 416 and D2B 418 will also detect a local coincidence. Ordered lists of measurements of time-correlated events can be constructed at the two locations that match without exchanging any classical data. This is another example of correlated data. One feature of this correlated data is that no common quantum state basis is needed to identify coincidences. In some embodiments, times between arrivals of time-correlated photons is used to produce a shared random number, and there is no need to share any information between locations to accumulate the shared number. In some embodiments, measurements of additional entangled basis information carried by the time-correlated photons is shared information and there is no need to exchange any information between nodes to accumulate this shared entangled state information. For example, polarization and/or position information can be shared in this way. Such embodiments can provide a high level of security.

In some embodiments, one or both of the coincidence detectors 420, 422 are connected to a processor 426, that can be one processor or multiple processors that can be distributed. This supports the processor 426 generating event lists that include coincident determinations from one or both of the coincidence detectors 420, 422. Those lists may be formulated as time stamps, marks in time bins, or other formats. In some embodiments, one or more of the detectors 412, 414, 416, 418 are connected to the processor 426 (only one connection shown). This supports the processor 426 generating event lists that include single photon detection measurements, that would typically also include background counts events, of the one or more of the connected detectors 412, 414, 416, 418. Those lists may be formulated as time stamps, marks in time bins, or other formats. Those lists may be in order of arrival time, as referred to as ordered event lists or lists of ordered measured events.

In some systems according to the present teaching, the photon source 402 is connected to a metadata collector 403. One or more detectors 412, 414, 416, 418 (only one connection is shown for simplicity in FIG. 4), one or two coincidence detectors 420, 422 (only one connection is shown for simplicity in FIG. 4) can be connected to a metadata collector 424 that is connected to processor 426. This supports the processor 426 generating metadata information lists. The lists can include, for example, one or more of number of coincidences in a time window, time-windows of expected entangled pairs based on pump pulse information, background counts or expected background levels based on detector bias point, measurement start and stop times in some coordinated time frame, quantum state coherence levels (including deterministic and probabilistic values or estimates), various wavefunction information, and many other kinds of information.

A metadata collector 403 is connected to the source 402 and a controller 405. The controller 405 is also connected to the source to provide control signals based on metadata. A controller 425 is connected to metadata collector 424, to the processor 426, detectors 412, 414, 416, 418 and the coincidence detectors 420, 422. The controllers 405, 425 are connected to share control information.

Thus, a heralded entangled quantum state information with metadata management system 400 of the present teaching includes quantum information in a quantum form as a set of entangled photons carrying quantum state potential information to different detectors. The heralded entangled quantum state information with metadata management system 400 uses quantum information in a classical form as metadata, where the metadata includes at least some of the coincidence detections produced by the coincidence detectors 420, 422. The metadata advantageously allows identification of the other pair of entangled photons, which can occur before (or after) a measurement of those pairs is completed. Metadata about the quantum information in the quantum form that is provided by the metadata collector 403 associated with the source 402 is used by the detectors 412, 414, 416, 418 to know when to start and stop measurement, and also can include basis information about the entangled set that can change over time. Where and when information that is part of the metadata generated by the metadata collector 403 can also be used in the system 400 to direct detectors 412, 414, 416, 418 when and/or where to detect, and to direct coincidence detectors 420, 422 when and/or where to detect coincidences and to direct processors 426 when to process coincidences to generate correlated data. The foregoing description describes some examples of quantum data and metadata for entanglement sharing that includes coincidences used for heralding entangled pairs.

The heralded entangled quantum state information with metadata management system 400 has significant advantages over known heralded quantum pair information systems that do not generate, communicate and process metadata in that they are easier to manage and control making them much more practical. Controllers 405, 425 add functionality making them more practical as they provide control of various components based on the metadata.

One feature of the present teaching is that it supports applications that use one or more basis of a hyper-entangled quantum state as quantum information. This can be for example, multidimensional entangled state sharing systems.

Figure 5A:
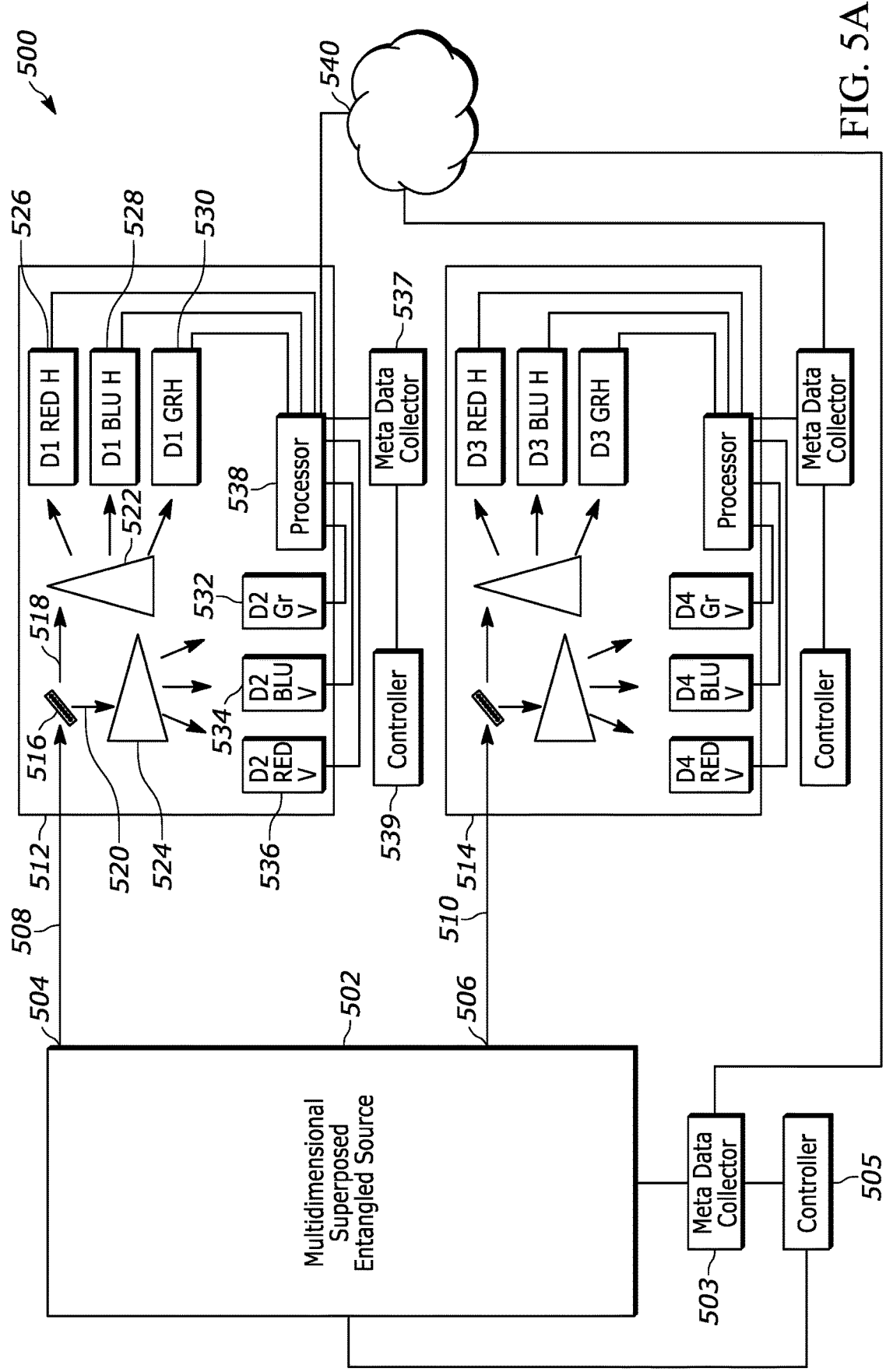
FIG. 5A illustrates an embodiment of a distributed multidimensional entangled quantum state information with metadata management system of the present teaching.

FIG. 5A illustrates an embodiment of a distributed multidimensional entangled quantum state information with metadata management system 500 of the present teaching. A multidimensional entangled source 502 provides one photon of a pair at a port 504 and the other photon of the pair at another port 506. A metadata collector 503 is connected to the source 502 to generate metadata about the source and generated photons. Each photon follows a corresponding path 508, 510, that could be in fiber, free space or other medium to a respective receiver 512, 514. Receiver 512 has a polarization element that splits input photons into two outputs 518, 520. The first output 518 is for photons in an H-polarization state, and the second output 520 is for photons in a V-polarization state. Each output couples photons to a prism 522, 524 that each serve to send photons with "red", "blue" and "green" colors to separate outputs. The terms "red", "blue" and "green" are general and refer only to photons with distinct wavelengths. Outputs of the prisms 522, 524 are coupled to single photon detectors 526, 528, 530, 532, 534, 536 with electrical outputs that connect to a processor 538 and a metadata collector 537 that connects to a classical network 540. Receiver 512 has a metadata collector 537 that connects to the processor 538 and also the various detectors to collect, share and use metadata.

Thus, photons are assigned to time bins for each combination of color and polarization available in the quantum state of a particular one of a pair of photons generate by the source 502 and received at receiver 512. Receiver 514 has the same configuration of receiver 512, and so also has data regarding time bins or timestamps for each combination of color and polarization available in the quantum state generator of the source 502. Receiver 514 also has a metadata collector. Thus, photons are assigned to time bins or timestamps for each combination of color and polarization available in the quantum state of a particular one of a pair of photons generate by the source 502 and received at receiver 514.

A controller 505 is connected to the metadata collector 503 and the source 502. A controller 539 is connected to components in receiver 512, including the collector 537, processor 538 and detectors 526, 528, 530, 532, 534, 536. A controller is connected to components in receiver 514, including the collector, processor and detectors. The controllers 505, 539 control components based on the metadata. The controllers 505, 509 connect to a network 540 to share control information.

The frequency dimension of entanglement is described in connection with the embodiment of FIG. 5A generates three values of entangled colors as just an example to illustrate the principle. As is understood by those skilled in the art, entangled frequency dimensions are possible with a range of number of possible outcomes from two and up to and including a continuum of values. Reference to colors, e.g., red, green and blue, as used herein is for clarity of description and not intended to limit the present teaching to frequencies of a perceived color or any particular frequency in the visible spectrum. Rather, reference to one of multiple colors indicates a system that can distinguish a particular frequency of light (or more generally frequency along the electromagnetic spectrum) from other frequencies. In the embodiment of FIG. 5A, a system 500 that uses time, three frequencies, and two polarizations is described, although the present teaching is not so limited in either number of dimensions or number of entangled states available in a dimension. In other systems, spatial position is also used as a basis. Frequencies, polarizations and/or spatial position can be correlated data.

An important feature of a multidimensional entangled quantum state information with metadata management system 500 is that some of the bases of entanglement can be used as metadata, and others used as correlated data, depending on the application.

Figure 5B:
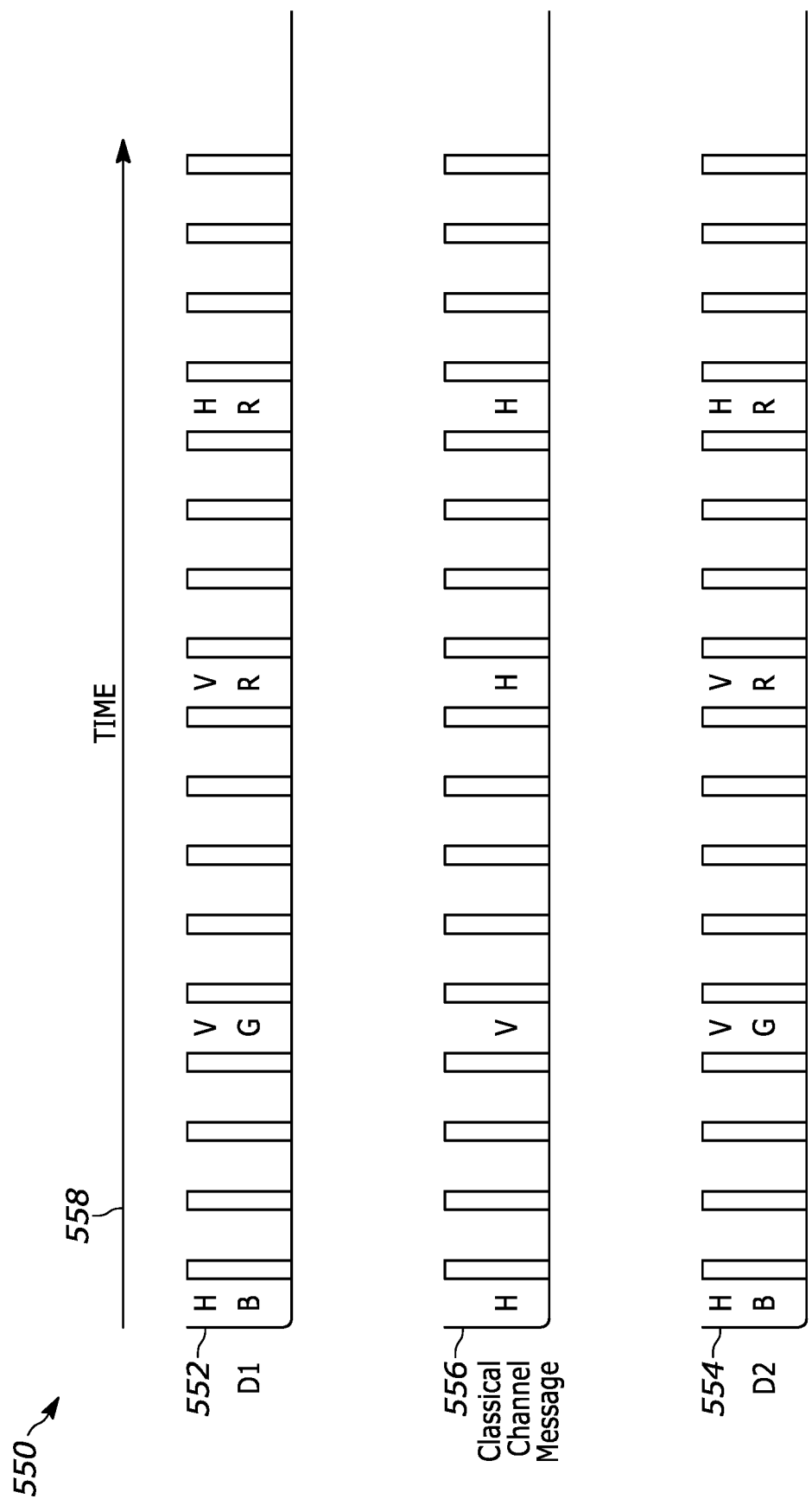
FIG. 5B illustrates examples of generated state combs for the distributed multidimensional entangled quantum state information with metadata management system of FIG. 5A.

FIG. 5B illustrates an embodiment of generated state combs 550 for the distributed multidimensional entangled quantum state information with metadata management system of FIG. 5A. Referring to both FIGS. 5A and 5B, timing combs generated by processors 540 in the receivers 512, 514 can be configured to contain one of six different symbols per time bin: 1) Red Vertical; 2) Red Horizontal; 3) Blue Vertical; 4) Blue Horizontal; 5) Green Vertical; and 6) Green Horizontal. Generated combs 552, 554 and 556 are illustrated against a common time-base 558. Receiver D1 512 processor generates a measured state comb 552 with color and polarization measured in bins 1, 5, 10 and 14. Receiver D2 514 processor generates a measured state comb 554 with color and polarization measured in bins 1, 5, 10 and 14. Receiver D1 processor also generates a shared state comb 556 with only measured polarization values. This shared state comb 556 is sent to processor in receiver 514, and used to align the measured state comb 554. Processor in receiver D2 514 correlates these entries, which serves to "align" the combs 552, 554 in time against time base 558 as shown in the figure. The processor in receiver D2 514 can then derive color values in the bins to derive the correlated color stream it shares with receiver D1 512. Although the color information is never exchanged, D2 is able to decode the color information via correlation. In this example, then, the timing information and polarization information are the metadata, and the color is the quantum correlated data. In various methods according to the present teaching, different combinations of these bases can be used. Combinations of these bases can change over time. In these embodiments, the metadata can be used to inform the nodes of which basis or bases are being used as correlated data.

EQUIVALENTS

While the Applicant's teaching is described in conjunction with various embodiments, it is not intended that the applicant's teaching be limited to such embodiments. On the contrary, the Applicant's teaching encompasses various alternatives, modifications, and equivalents, as will be appreciated by those of skill in the art, which may be made therein without departing from the spirit and scope of the teaching.

What is claimed is:

1. A quantum information system with metadata management, the system comprising:
   a) an entangled quantum state source configured to generate quantum information in a quantum form comprising two entangled states;
   b) a metadata collector configured to generate metadata associated with the generated quantum information in the quantum form comprising the two entangled states, wherein the metadata is in a classical form;
   c) a first receiver configured to receive and measure one of the two entangled states, thereby generating quantum state information in a classical form comprising a first state value and a first time of arrival;
   d) a second receiver configured to receive and measure the other of the two entangled states, thereby generating quantum state information in a classical form comprising a second state value and a second time of arrival;
   e) a first processor coupled to the metadata collector and coupled to the first receiver, the first processor generating a comb using the first time of arrival and using the metadata to tag the generated quantum state information in a classical form comprising the first state value; and
   f) a second processor coupled to the first processor and to the second receiver, and configured to process the comb and the metadata to determine correlated data associated with the two entangled states.

2. The quantum information system of claim 1 wherein the first processor and the second processor are the same processor.

3. The quantum information system of claim 1 wherein the second processor is further configured to process the determined correlated data associated with the two entangled states to generate a shared secret.

4. The quantum information system of claim 1 wherein the second processor is further configured to process the determined correlated data associated with the two entangled states to generate an address.

5. The quantum information system of claim 1 wherein the second processor is further configured to process the correlated data associated with the two entangled states to generate an image from the determined correlated data associated with the two entangled states.

6. The quantum information system of claim 1 wherein the second processor is further configured to derive time from the determined correlated data associated with the two entangled states.

7. The quantum information system of claim 1 wherein the second processor is further configured to determine location data from the determined correlated data associated with the two entangled states.

8. The quantum information system of claim 1 wherein the metadata comprises at least one of where and when data, a basis of the state value data, background information, an index, or information related to how the state information is being presented.

9. The quantum information system of claim 1 wherein the metadata changes as a function of time.

10. The quantum information system of claim 1 wherein the determined correlated data comprises data in a quantum form.

11. The quantum information system of claim 1 wherein the determined correlated data comprises data in a classical form.

12. The quantum information system of claim 1 wherein the determined correlated data comprises a polarization value, a color, an interarrival time, or a spatial position.

13. The quantum information system of claim 1 wherein the metadata collector is coupled to the entangled quantum state source and is configured to generate metadata from the entangled quantum state source.

14. The quantum information system of claim 1 wherein the metadata collector is coupled to at least one of the first and second receiver and is configured to generate metadata from a detector.

15. A method of managing metadata in a quantum information system, the method comprising:
   a) generating quantum information in a quantum form comprising two entangled states;
   b) generating metadata in a classical form that is associated with the generated quantum information in the quantum form comprising the two entangled states;
   c) measuring one of the two entangled states, thereby generating quantum state information in a classical form comprising a first state value and a first time of arrival;
   d) measuring another of the two entangled states, thereby generating quantum state information in a classical form comprising a second state value and a second time of arrival;
   e) generating a comb using the first time of arrival and using the metadata to tag the generated quantum state information in the classical form comprising the first state value; and
   f) processing the comb and the metadata to determine correlated data associated with the two entangled states.

16. The method of claim 15 wherein the metadata comprises at least one of where and when data, a basis of the state value data, background information, an index, or information related to how the state information is being presented.

17. The method of claim 15 wherein the metadata changes as a function of time.

18. The method of claim 15 further comprising generating a shared secret from the correlated data associated with the two entangled states.

19. The method of claim 15 further comprising synchronizing clocks using the correlated data associated with the two entangled states.

20. The method of claim 15 further comprising coordinating addresses across nodes using the correlated data associated with the two entangled states.

* * * * *